US008861981B2

United States Patent
Liu et al.

(10) Patent No.: US 8,861,981 B2
(45) Date of Patent: Oct. 14, 2014

(54) OPTICAL SIGNAL COMPENSATION DEVICE

(71) Applicant: Huawei Technologies Co., Ltd., Shenzhen (CN)

(72) Inventors: Ling Liu, Shenzhen (CN); Liangchuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 13/845,575

(22) Filed: Mar. 18, 2013

(65) Prior Publication Data

US 2014/0093255 A1    Apr. 3, 2014

Related U.S. Application Data

(63) Continuation of application No. PCT/CN2011/083292, filed on Dec. 1, 2011.

(51) Int. Cl.
*H04B 10/06* (2006.01)
*H04B 10/2513* (2013.01)
*H04B 10/2543* (2013.01)
*H04B 10/61* (2013.01)

(52) U.S. Cl.
CPC ...... *H04B 10/6163* (2013.01); *H04B 10/25133* (2013.01); *H04B 10/2543* (2013.01); *H04B 10/6161* (2013.01)
USPC ........... 398/208; 398/147; 398/158; 398/159; 398/81

(58) Field of Classification Search
CPC ........... H04B 10/6971; H04B 10/6163; H04B 10/60; H04B 2210/252; H04B 10/6161; H04B 10/2507; H04B 10/2513; G02B 6/29394
USPC ........... 398/208, 202, 205, 81, 147, 148, 149, 398/158, 159
See application file for complete search history.

(56) References Cited

U.S. PATENT DOCUMENTS 5,884,150 A * 3/1999 Sugawara .................. 455/127.1
6,335,757 B1 * 1/2002 Vodanovic ..................... 348/311
(Continued)

FOREIGN PATENT DOCUMENTS

CN          1433601 A     7/2003
CN        102227660 A    10/2011
(Continued)

OTHER PUBLICATIONS

Savory et al., "Digital Coherent Optical Receivers: Algorithms and Subsystems" IEEE Journal of Selected Topics in Quantum Electronics, vol. 16, No. 5, Sep./Oct. 2010, 16 pages.

(Continued)

*Primary Examiner* — Daniel Washburn
*Assistant Examiner* — Hibret Woldekidan
(74) *Attorney, Agent, or Firm* — Brinks Gilson & Lione

(57) ABSTRACT

Embodiments of the present invention disclose an optical signal compensation device, where, a nonlinear compensation module in the optical signal compensation device adopts a new nonlinear compensation algorithm to perform nonlinear compensation on an optical signal, and during the process of performing the nonlinear compensation, it is no longer required to look up a table. Technical solutions provided in the embodiments of the present invention can effectively increase the processing speed of the nonlinear compensation, thereby reducing the overall processing delay of an optical signal compensation system.

17 Claims, 26 Drawing Sheets

(56) References Cited

U.S. PATENT DOCUMENTS

| | | | |
|---|---|---|---|
| 7,336,725 B2 * | 2/2008 | Cova | 375/296 |
| 7,366,252 B2 * | 4/2008 | Cova et al. | 375/296 |
| 7,701,842 B2 * | 4/2010 | Roberts et al. | 370/210 |
| 7,769,305 B1 * | 8/2010 | Roberts et al. | 398/206 |
| 7,894,728 B1 * | 2/2011 | Sun et al. | 398/208 |
| 8,112,001 B2 * | 2/2012 | Lowery et al. | 398/158 |
| 8,271,223 B2 * | 9/2012 | Rawlins et al. | 702/90 |
| 8,447,190 B2 * | 5/2013 | Tanimura et al. | 398/206 |
| 2007/0177878 A1 | 8/2007 | Yoshimoto et al. | |
| 2007/0206954 A1 | 9/2007 | Fishman et al. | |
| 2009/0190929 A1 | 7/2009 | Khurgin et al. | |
| 2010/0196017 A1 * | 8/2010 | Tanimura et al. | 398/159 |
| 2010/0239261 A1 | 9/2010 | Li et al. | |
| 2010/0239262 A1 * | 9/2010 | Li et al. | 398/81 |
| 2011/0229143 A1 | 9/2011 | Buelow et al. | |
| 2012/0290244 A1 * | 11/2012 | Yan et al. | 702/86 |
| 2013/0031442 A1 * | 1/2013 | Rawlins et al. | 714/763 |
| 2013/0209098 A1 * | 8/2013 | Huang et al. | 398/43 |
| 2014/0099128 A1 * | 4/2014 | Mateo et al. | 398/158 |

FOREIGN PATENT DOCUMENTS

| | | |
|---|---|---|
| CN | 102255667 A | 11/2011 |
| EP | 1257076 A1 | 11/2002 |
| EP | 2157716 A1 | 2/2010 |

OTHER PUBLICATIONS

Millar et al., "Mitigation of Fiber Nonlinearity Using a Digital Coherent Receiver" IEEE Journal of Selected Topics in Quantum Electronics, vol. 16, No. 5, Sep./Oct. 2010, 10 pages.

International Search Report issued in corresponding PCT Patent Application No. PCT/CN2011/083292, mailed Sep. 13, 2012.

Ip et al., "Compensation of Dispersion and Nonlinear Impairments Using Digital Backpropagation" Journal of Lightwave Technology, vol. 26, No. 20, Oct. 15, 2008.

* cited by examiner

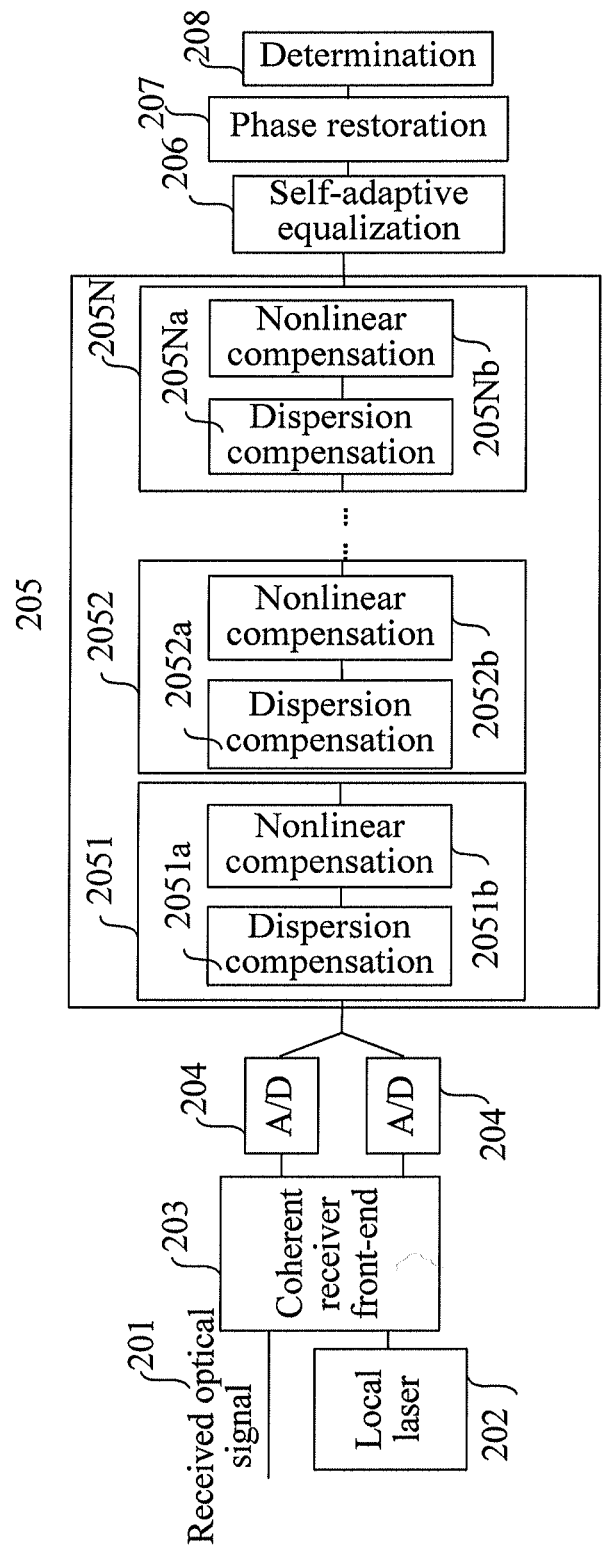
FIG. 2-a

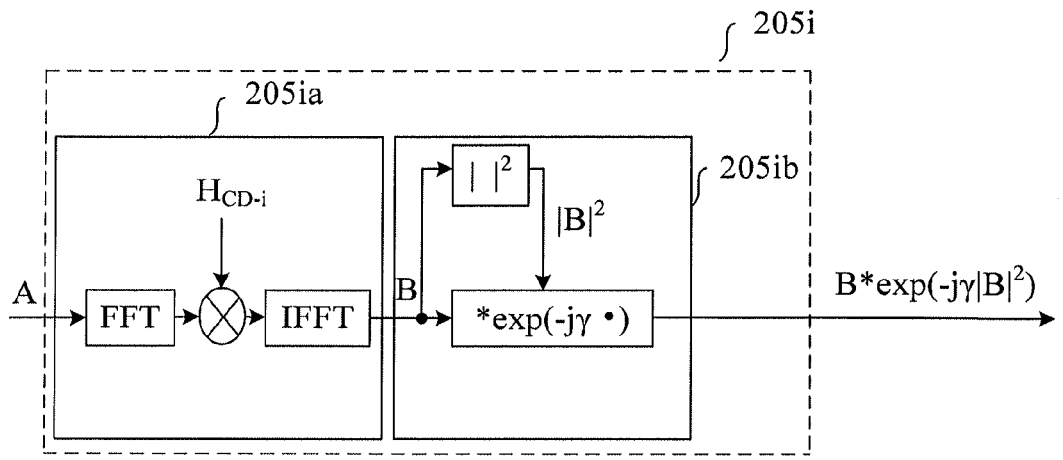
FIG. 2-b
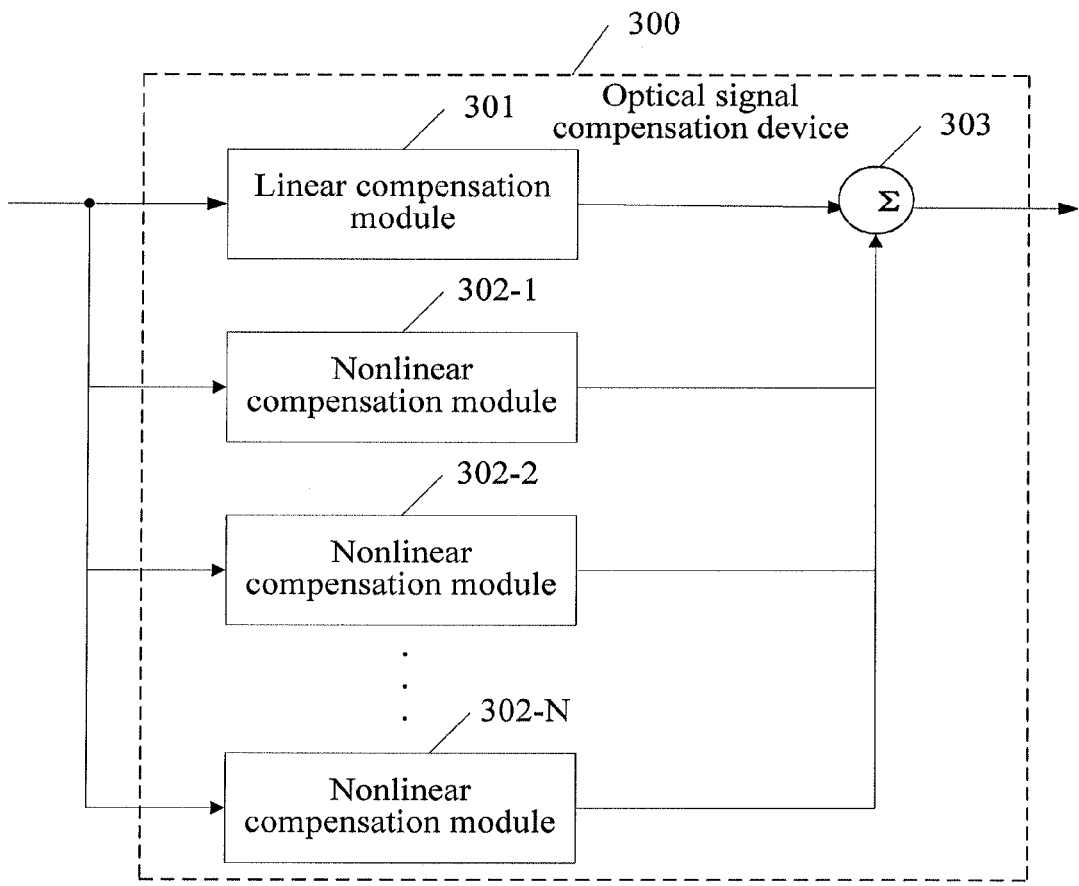
FIG. 3-a

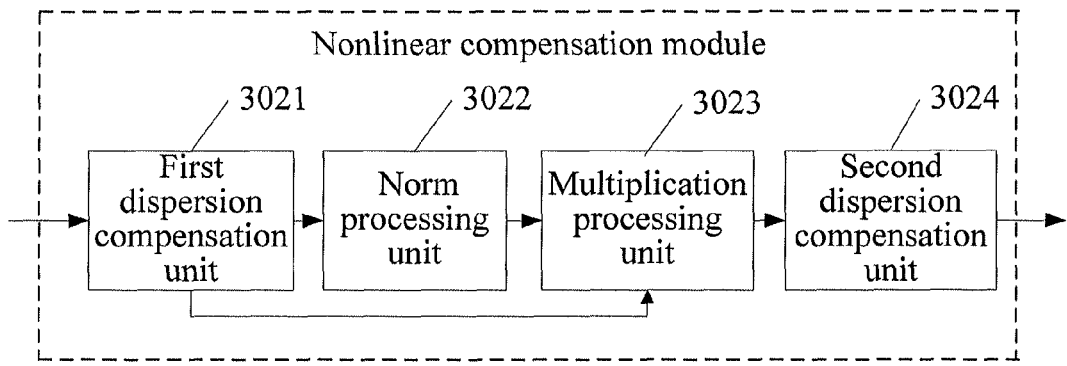
FIG. 3-b
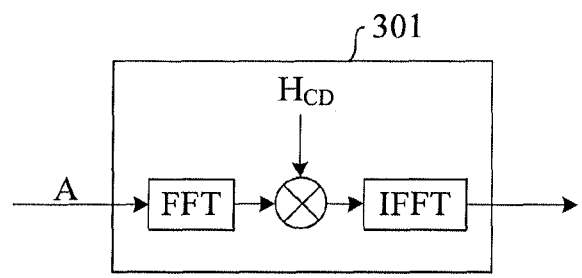
FIG. 4-a
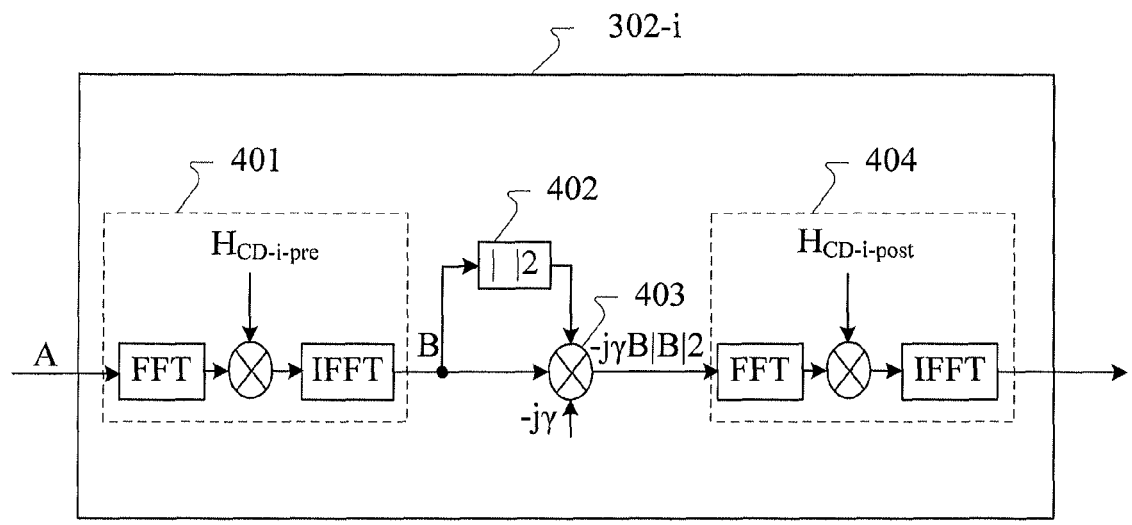
FIG. 4-b

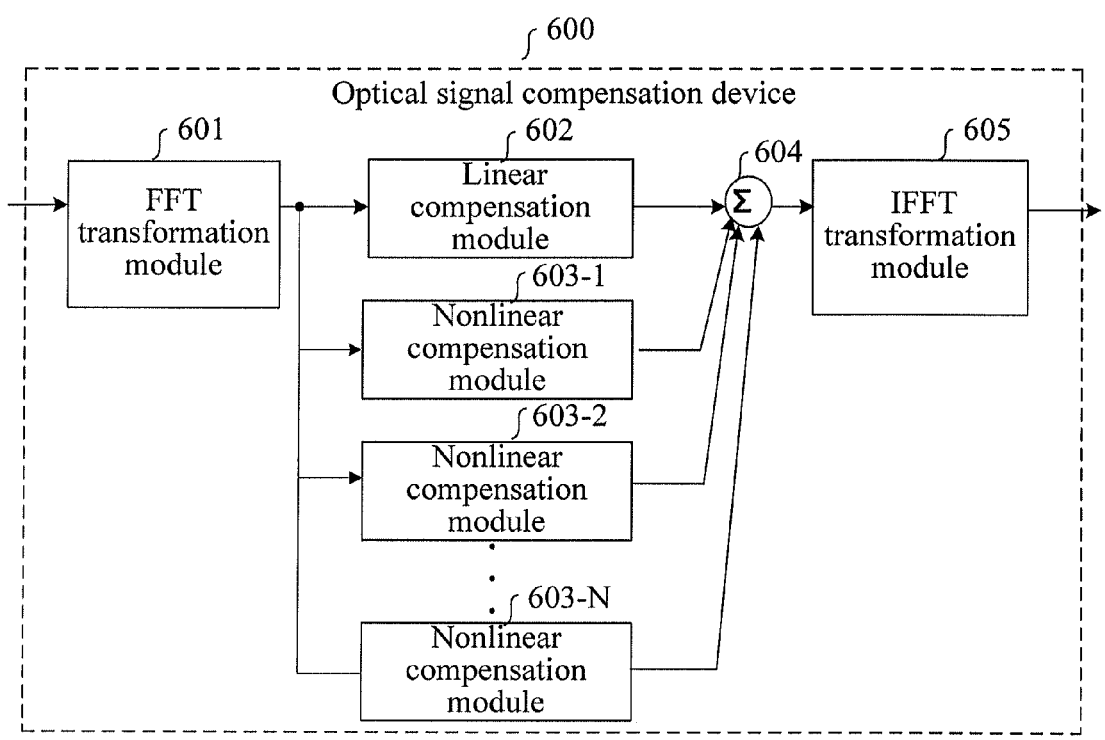
FIG. 6-a

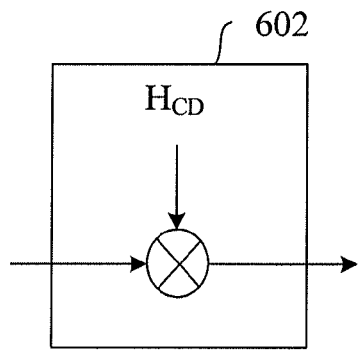
FIG. 6-b
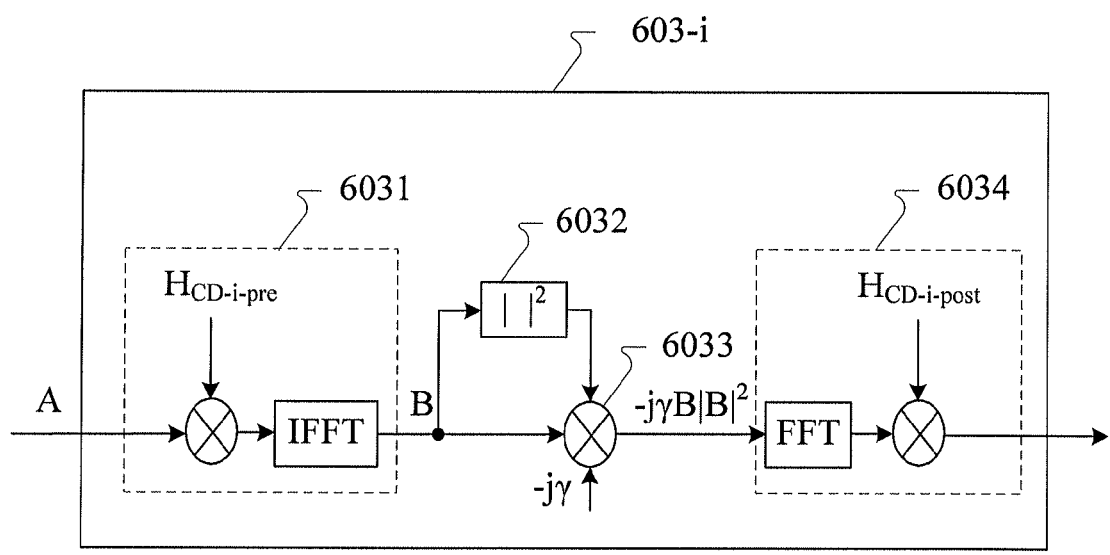
FIG. 6-c

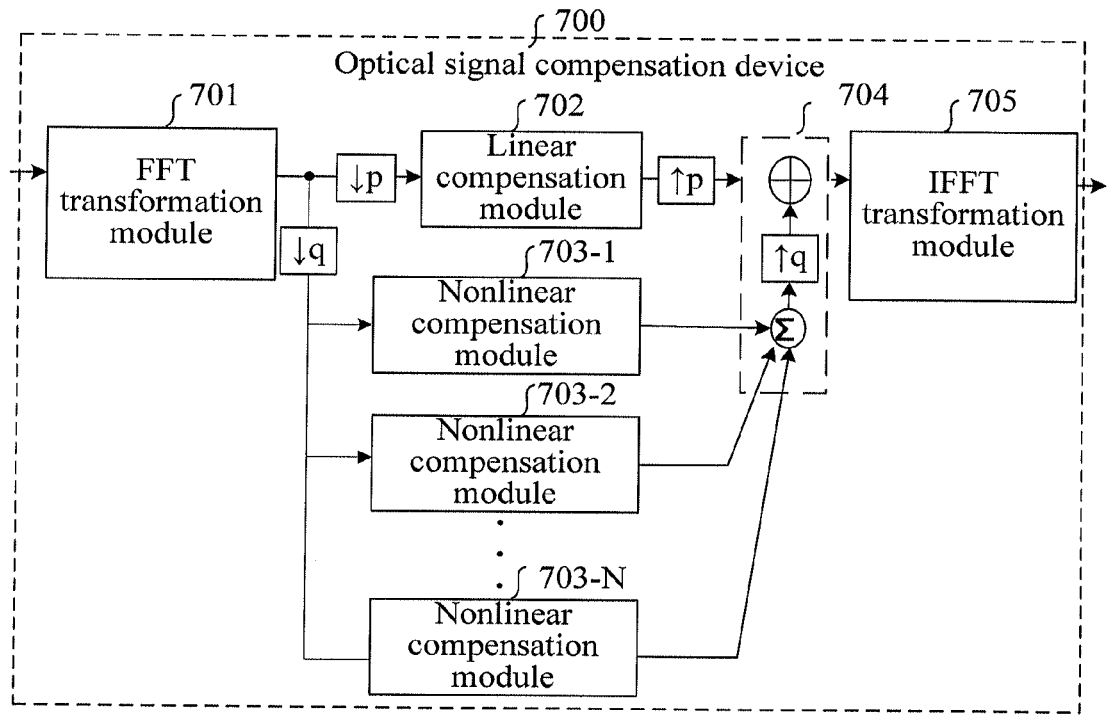
FIG. 7
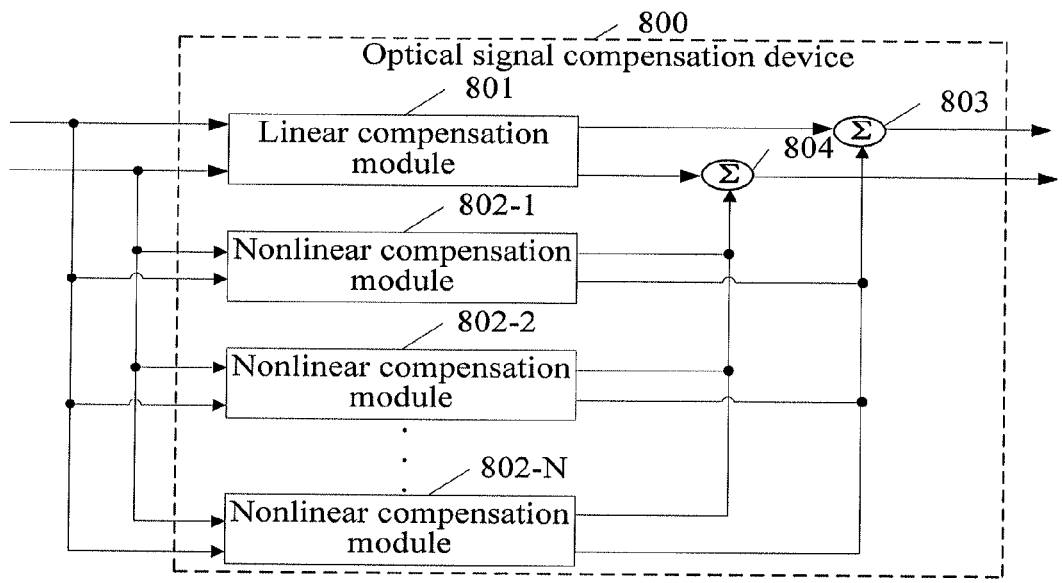
FIG. 8-a

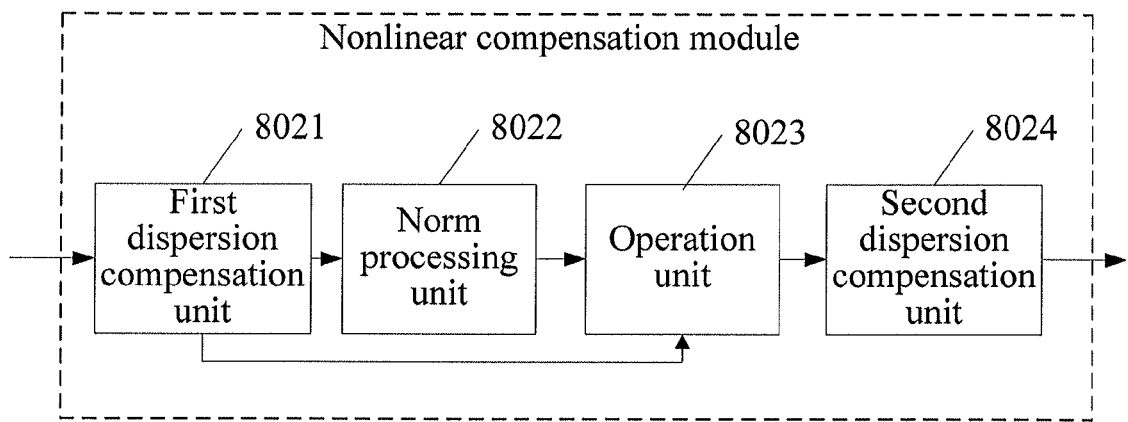
FIG. 8-b
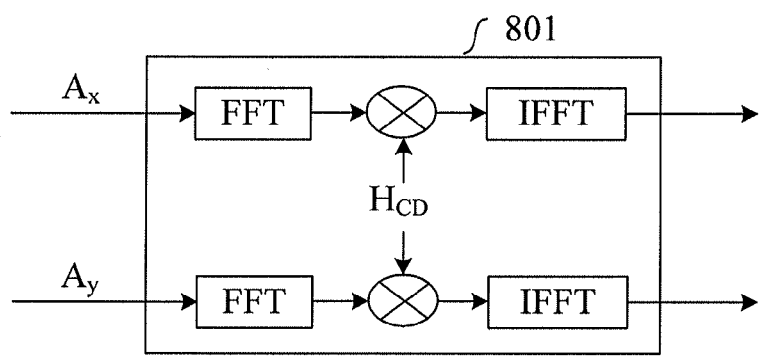
FIG. 9-a

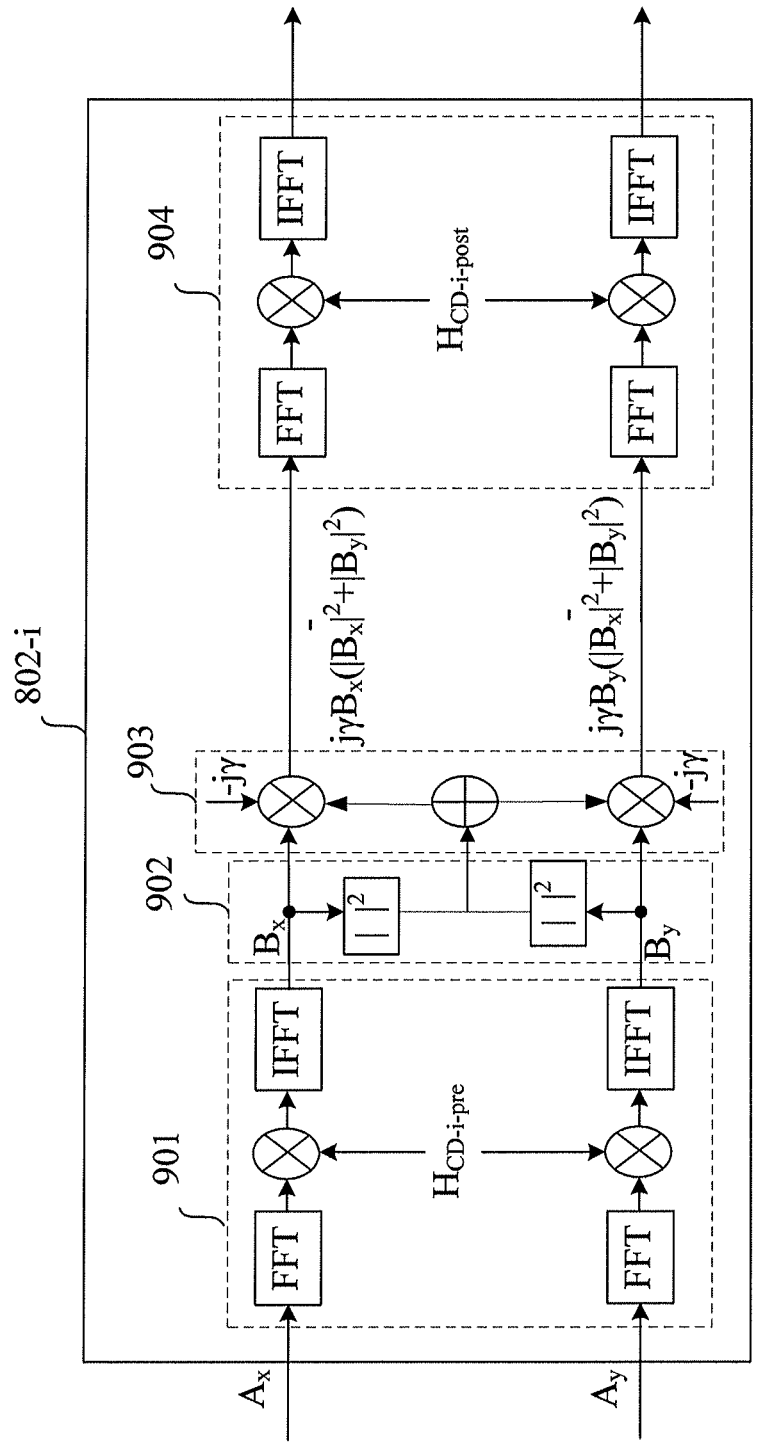
FIG. 9-b

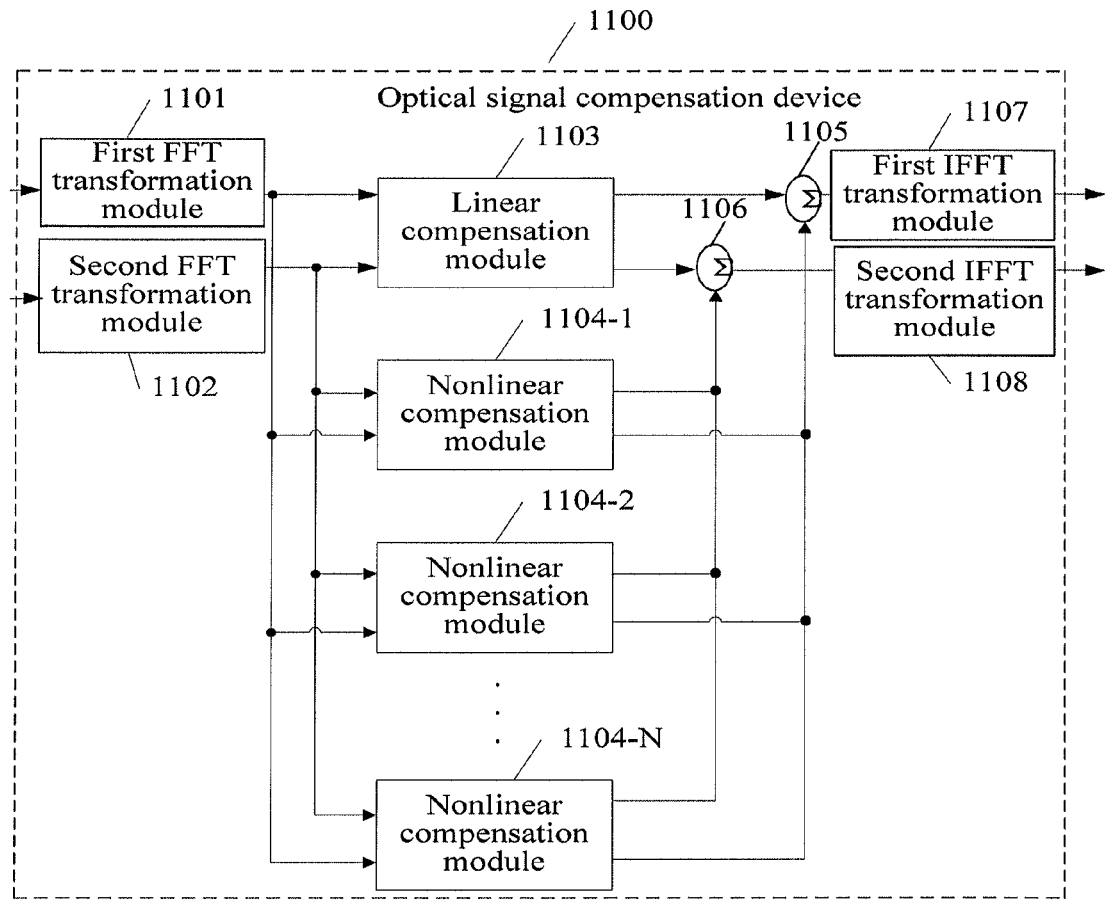
FIG. 11-a
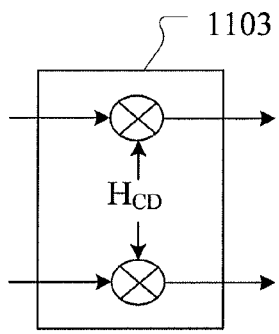
FIG. 11-b

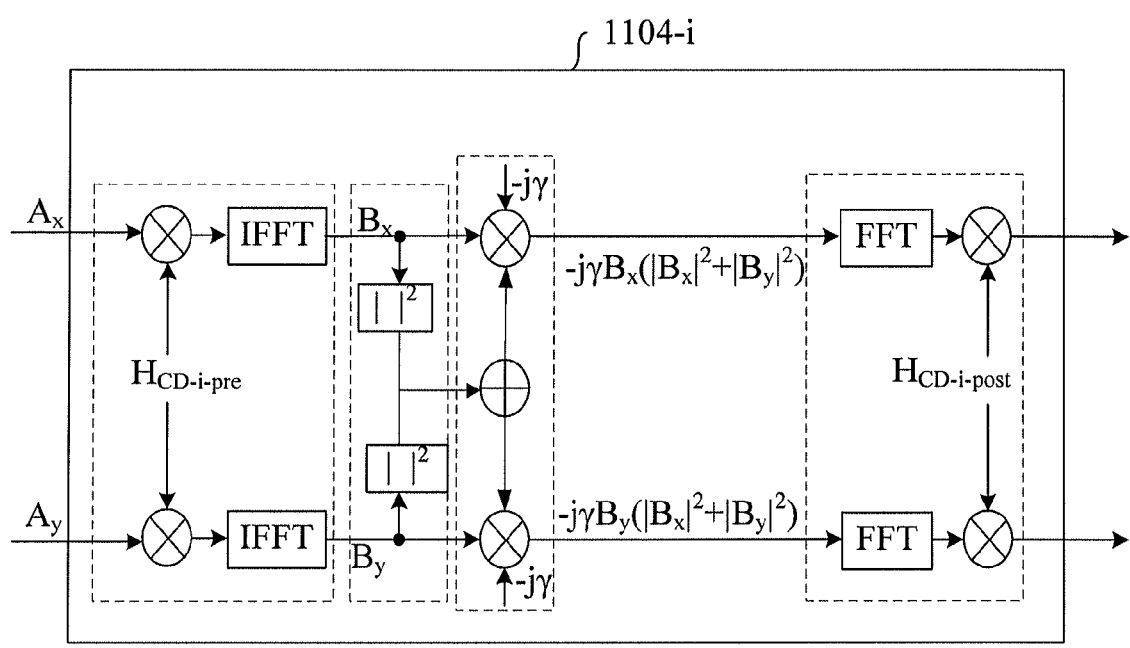
FIG. 11-c

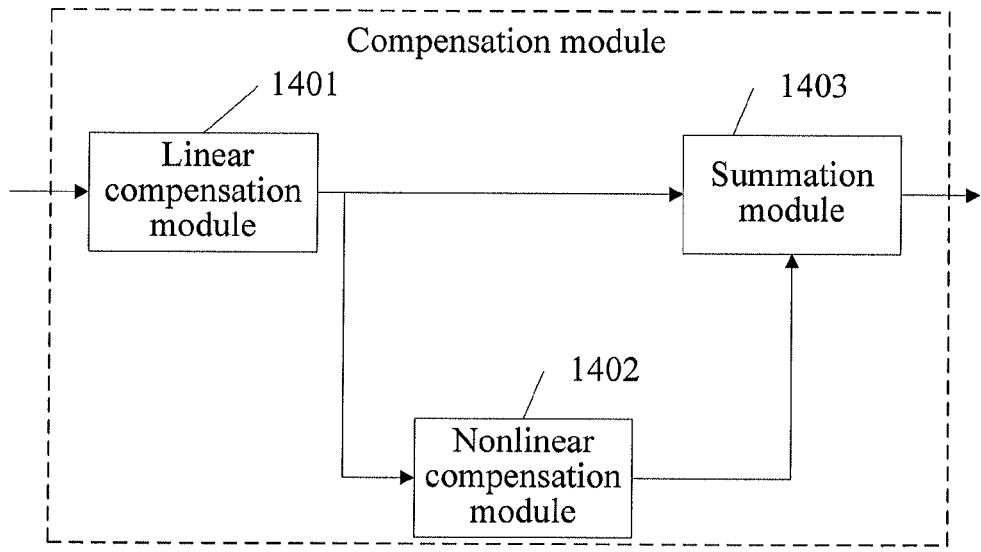
FIG. 14-a
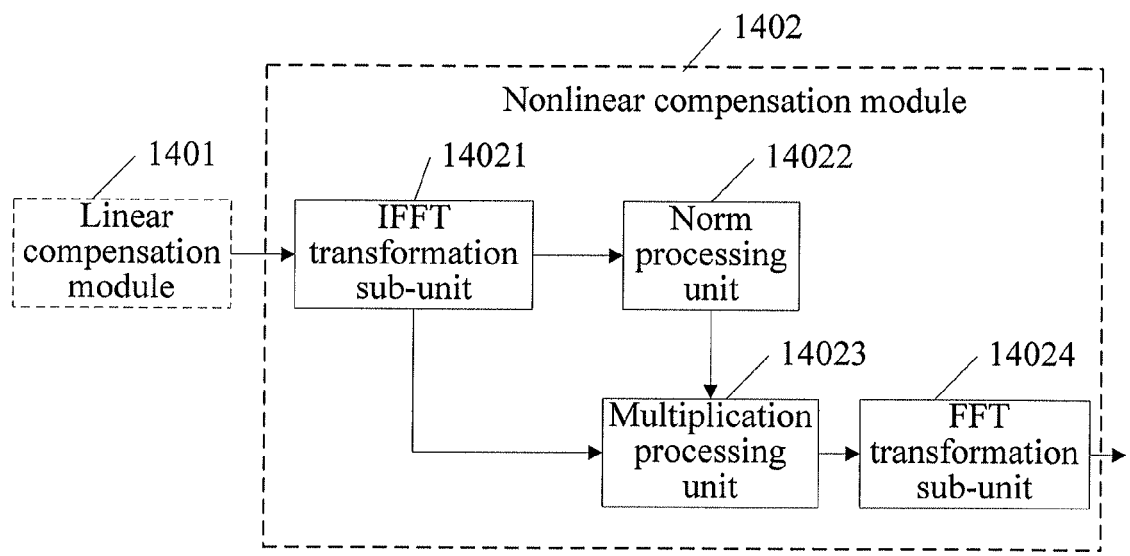
FIG. 14-b

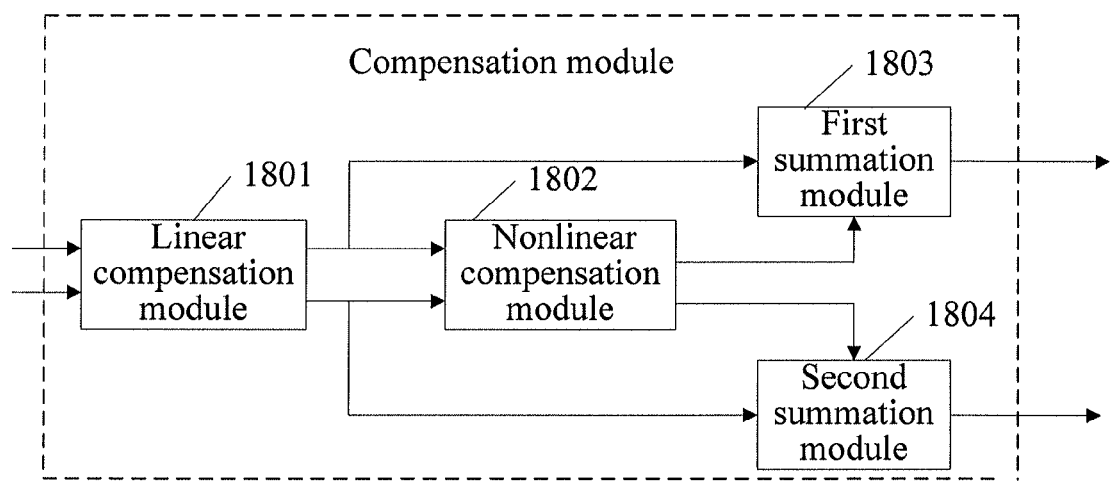
FIG. 18-a

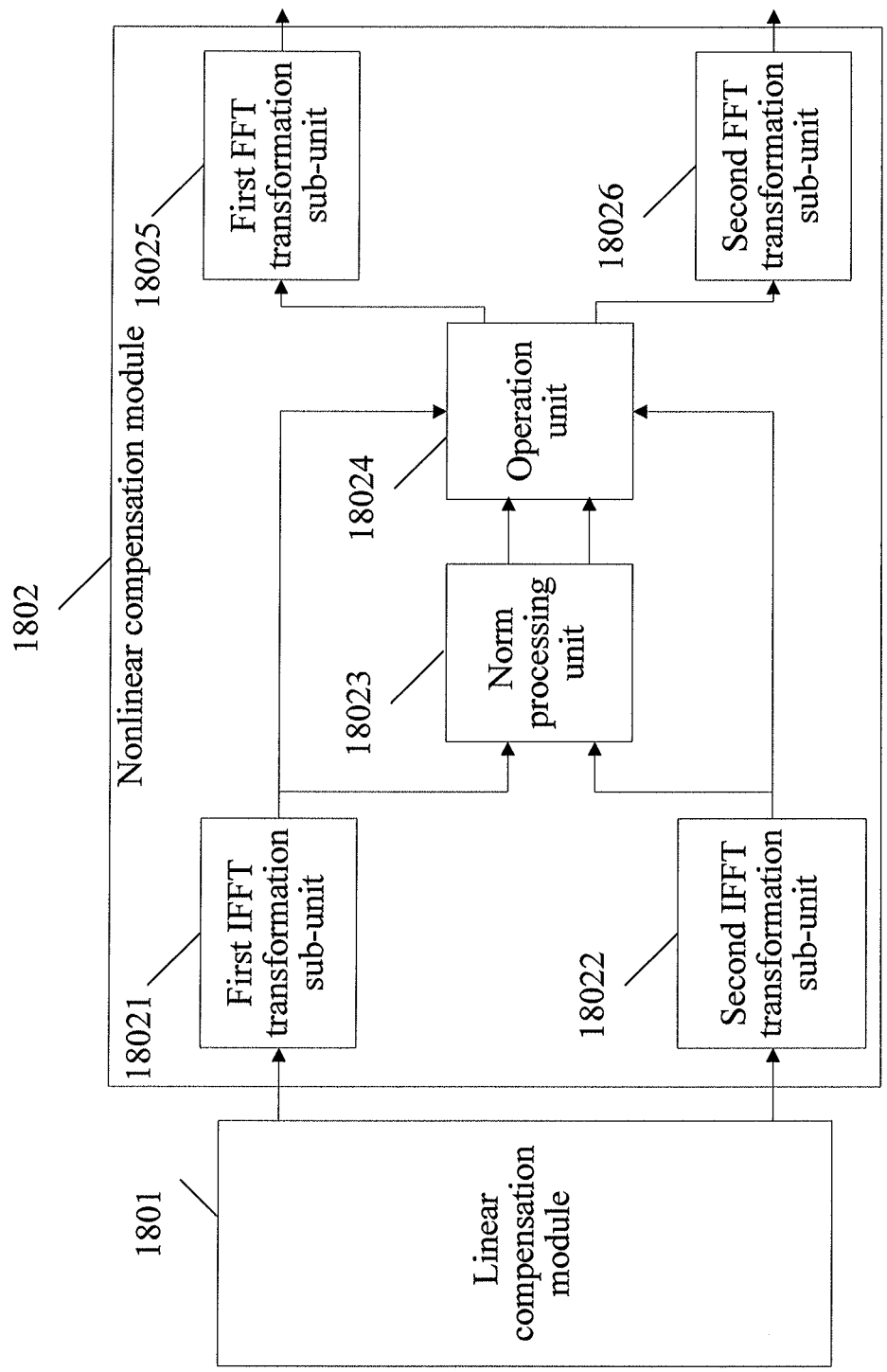
FIG. 18-b

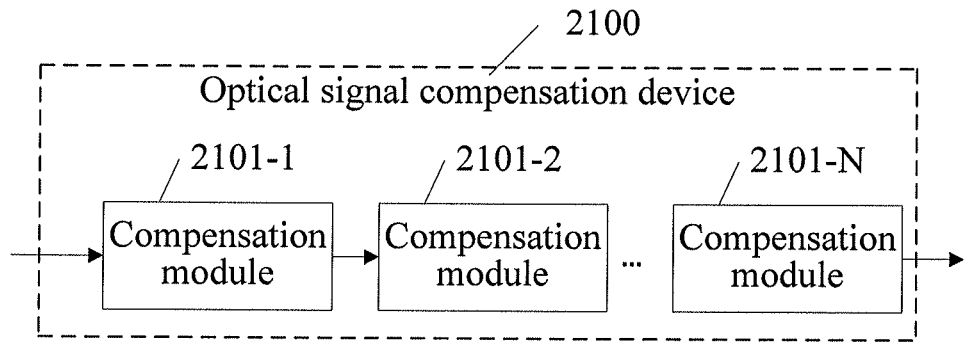
FIG. 21
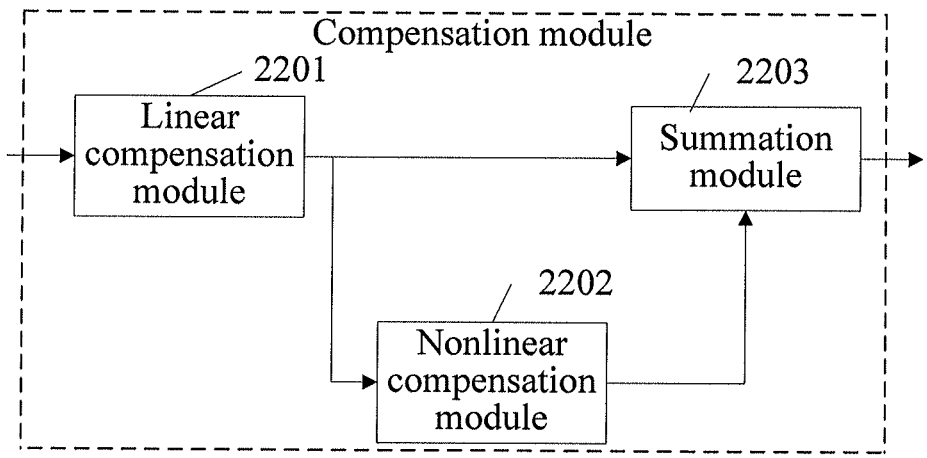
FIG. 22-a
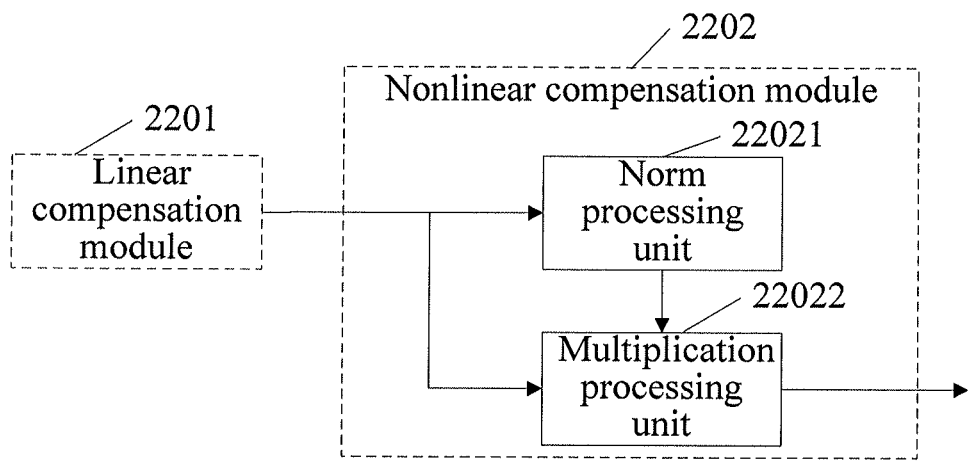
FIG. 22-b

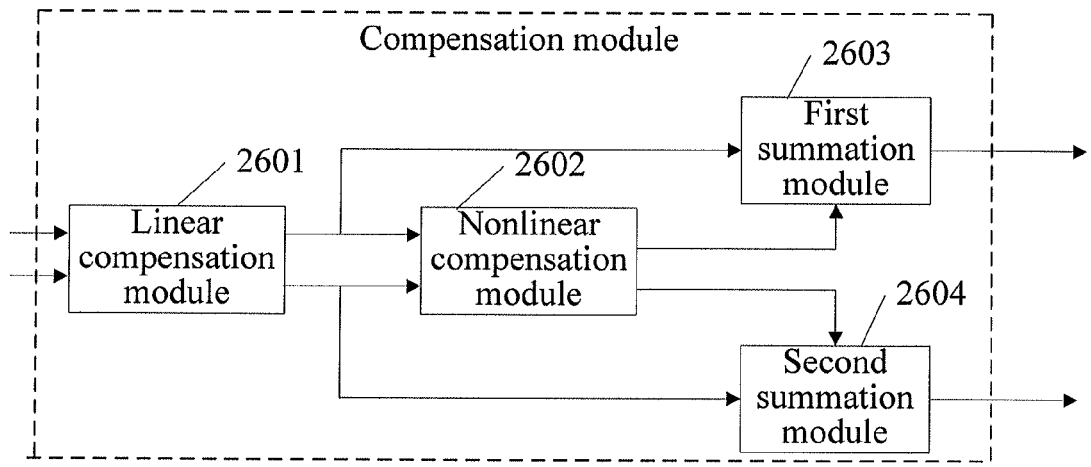
FIG. 26-a
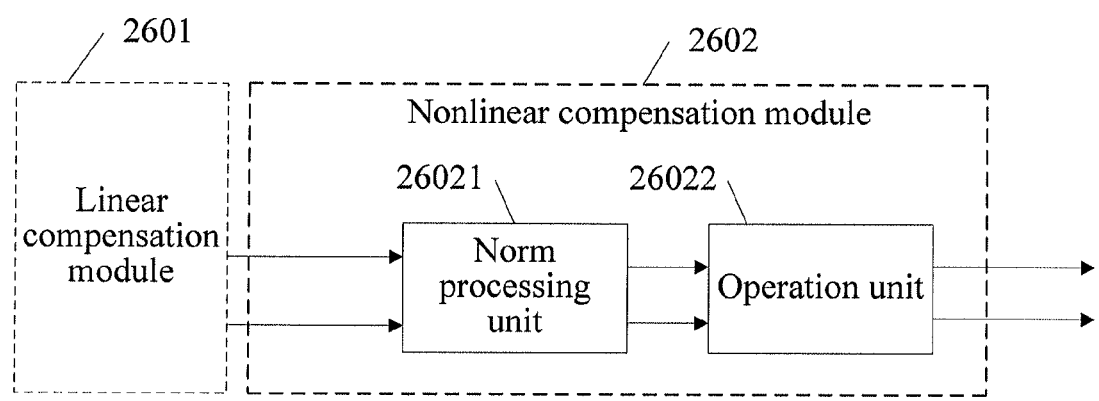
FIG. 26-b

OPTICAL SIGNAL COMPENSATION DEVICE

CROSS-REFERENCE TO RELATED APPLICATIONS

This application is a continuation of International Application No. PCT/CN2011/083292, filed on Dec. 1, 2011, which is hereby incorporated by reference in its entirety.

FIELD OF THE INVENTION

The present invention relates to the field of communications, and in particular, to an optical signal compensation device.

BACKGROUND OF THE INVENTION

A typical optical communication system includes a pair of network nodes connected through an optical waveguide (for example, an optical fiber). An optical signal is transmitted between each pair of nodes through an optical transmission link. The optical transmission link between the network nodes is generally constructed by multiple optical modules, and multiple optical fiber spans are connected through optical amplifiers. FIG. 1 shows a typical wavelength division multiplexing transmission system. Optical signal transmitters 1011~101M generate M transmission signals of different wavelengths, and the signals are combined into a combined optical signal through a wavelength division multiplexer 102 and then transmitted through an optical fiber link. The transmission link includes N optical fiber spans 1031~103N that are connected through optical amplifiers 1041~404N, where $D_1$~$D_N$ are dispersion caused by optical fiber spans. At a receiving end, a wavelength division multiplexing signal first passes through a demultiplexer 105 to separate signals of different wavelengths, and the signals are received by receivers 1061~106M respectively to restore original information.

During a process in which the optical signal is transmitted through the transmission link, the damage such as dispersion, polarization mode dispersion, polarization dependent loss, ray nonlinearity, and noise of amplifiers is caused, so that the performance is deteriorated. In the current optical communication network, generally, it is expected to increase the incident power of a transmission signal, so that the signal received at the receiving end has power that is large enough, so as to ensure that the receiving end has a signal to noise ratio that is large enough after the signal passes through the transmission link, and ensure that a code error rate of the receiving end is less than a certain threshold, thereby enabling the signal to be transmitted effectively. However, due to the nonlinear property of optical fiber transmission, the increasing of the incident power amplifies the nonlinear effect during the transmission, and therefore, the increasing of the incident power cannot always increase the transmission performance. If the incident power is already greater than the optimal incident power (the system performance is optimal when the incident power is the optimal incident power), the increasing of the incident power results in the reduction of the system performance. Therefore, in prior art, generally, the nonlinearity of the optical fiber is compensated to expand the possible transmission distance, so as to improve the performance of the system.

FIG. 2-a is a schematic structural diagram of performing compensation on an optical signal at a receiving end in a single polarization system in the manner of digital signal processing. A received optical signal 201 and a local optical carrier signal generated by a local laser 202 are input to a coherent receiver front-end 203. The coherent receiver front-end 203 converts the received optical signals into in-phase and quadrature (that is, I/Q) baseband electrical signals, which pass through an analog-to-digital converter A/D 204 that outputs sampled digital signals, and the digital signals are input to a compensation module 205 to complete dispersion compensation and nonlinear compensation. The dispersion compensation and nonlinear compensation are accomplished in series by adopting N compensation modules. Each compensation module includes a dispersion compensation module 205$ia$ and a nonlinear compensation module 205$ib$ (i is any value between 1 and N) that are connected in series. The compensated signals are input to a self-adaptive equalization module 206, so as to compensate residual system damage and track system changes. An output signal of the self-adaptive equalization module 206 is input to a phase restoration module 207 to compensate phase noise caused by frequency difference line-width of the laser, and a determination module 208 performs determination to restore an original bit sequence. FIG. 2-b is a specific implementation of the compensation on signal by nonlinear compensation module 2051. The dispersion compensation module 205$ia$ is implemented through a frequency domain, that is, an input signal A is first converted into a frequency domain signal through Fast Fourier Transformation (FFT, Fast Fourier Transformation) and multiplied by an ith function $H_{CD\text{-}i}$ of frequency domain dispersion compensation, the frequency domain signal is then converted into a time domain signal B through Inverse Fast Fourier Transformation (IFFT, Inverse Fast Fourier Transformation), and the time domain signal B is sent to the nonlinear compensation module 205$ib$ to accomplish the nonlinear compensation shown in the drawing. The compensated dispersion is dispersion caused by an (N−i+1)th optical fiber span in the transmission link, that is, in the modules 2051~205N, the dispersion compensated by the dispersion compensation modules 2051a~205Na is the dispersion caused in $D_N$~$D_1$ in FIG. 1, respectively.

It can be seen from the nonlinear compensation module 205$ib$ that, the foregoing solution performs the nonlinear compensation by adopting a formula $B*\exp(-j\gamma|B|^2)$, B is obtained on the basis of a dynamic received data stream, and therefore, in the foregoing solution, a sine function lookup table and a cosine function lookup table related to B are first calculated, for example, values of $\cos \gamma|B|^2$ and $\sin \gamma|B|^2$ corresponding to different Bs, so that a result of $B*\exp(-j\gamma|B|^2)$ is calculated through looking up the tables when the nonlinear compensation is performed. The foregoing solution requires calculation through looking up tables when the nonlinear compensation is performed, resulting in a long delay of the processing.

SUMMARY OF THE INVENTION

Embodiments of the present invention provide an optical signal compensation device, configured to reduce the processing delay of an optical signal compensation system.

In order to solve the foregoing technical problems, the embodiments of the present invention provide the following technical solutions:

An optical signal compensation device, applicable to a single polarization system, includes:

a linear compensation module and N nonlinear compensation modules, wherein all of the nonlinear compensation modules and the linear compensation module are connected in parallel.

The linear compensation module is configured to perform dispersion compensation on an input signal according to a first compensation dispersion value, where the first compensation dispersion value equals to the total amount of dispersion caused in an optical fiber transmission link.

The nonlinear compensation module includes a first dispersion compensation unit, a norm processing unit, a multiplication processing unit, and a second dispersion compensation unit.

The first dispersion compensation unit is configured to perform dispersion compensation on the input signal according to a second compensation dispersion value.

The norm processing unit is configured to take a modulus of an output signal of the first dispersion compensation unit and square the modulus to obtain a norm value.

The multiplication processing unit is configured to calculate a product of the output signal of the first dispersion compensation unit, the norm value, and a preset imaginary constant, so as to obtain a nonlinear compensation output signal.

The second dispersion compensation unit is configured to perform dispersion compensation on the nonlinear compensation output signal according to a third compensation dispersion value, so as to obtain an output signal of the nonlinear compensation module, where, a sum of the second compensation dispersion value and the third compensation dispersion value equals to the first compensation dispersion value.

The optical signal compensation device further includes a summation module, the summation module is connected to an output end of the linear compensation module and output ends of the N nonlinear compensation modules, and configured to perform summation on the output signals of the linear compensation module and the N nonlinear compensation modules.

An optical signal compensation device, applicable to a polarization multiplexing system, includes:

a linear compensation module and N nonlinear compensation modules, wherein all of the nonlinear compensation modules and the linear compensation module are connected in parallel.

The linear compensation module is configured to perform dispersion compensation separately on two input signals according to a first compensation dispersion value, where the first compensation dispersion value equals to the total amount of dispersion caused in an optical fiber transmission link.

The nonlinear compensation module includes a first dispersion compensation unit, a norm processing unit, an operation unit, and a second dispersion compensation unit.

The first dispersion compensation unit is configured to perform dispersion compensation on the two input signals respectively according to a second compensation dispersion value.

The norm processing unit is configured to take a first modulus of a first output signal of the first dispersion compensation unit and square the first modulus to obtain a first norm value, and take a second modulus of a second output signal of the first dispersion compensation unit and square the second modulus to obtain a second norm value.

The operation unit is configured to multiply a sum of the first norm value and the second norm value with the first output signal of the first dispersion compensation unit and a preset imaginary constant, so as to obtain a first nonlinear compensation output signal; and is configured to multiply the sum of the first norm value and the second norm value with the second output signal of the second dispersion compensation processing unit and the preset imaginary constant, so as to obtain a second nonlinear compensation output signal.

The second dispersion compensation unit is configured to perform dispersion compensation on the first nonlinear compensation output signal and the second nonlinear compensation output signal according to a third compensation dispersion value, so as to obtain a first output signal and a second output signal of the nonlinear compensation module, where, a sum of the second compensation dispersion value and the third compensation dispersion value equals to the first compensation dispersion value.

The optical signal compensation device further include: a first summation module and a second summation module.

The first summation module is connected to a first signal output end of the linear compensation module and first signal output ends of the N nonlinear compensation modules, and configured to perform summation on the first output signals of the linear compensation module and the N nonlinear compensation modules.

The second summation module is connected to a second signal output end of the linear compensation module and second signal output ends of the N nonlinear compensation modules, and configured to perform summation on the second output signals of the linear compensation module and the N nonlinear compensation modules.

An optical signal compensation device, applicable to a single polarization system, includes:

N compensation modules connected in series;

an FFT transformation module, connected to an input end of a first compensation module, where the FFT transformation module is configured to perform Fast Fourier Transformation (FFT) on an input signal of the first compensation module; and an IFFT transformation module, connected to an output end of an Nth compensation module, where the IFFT transformation module is configured to perform Inverse Fast Fourier Transformation (IFFT) on an output signal of the Nth compensation module.

A compensation module includes a linear compensation module, a nonlinear compensation module, and a summation module.

The linear compensation module is configured to perform dispersion compensation on an input signal.

The nonlinear compensation module includes: an IFFT transformation sub-unit, a norm processing unit, a multiplication processing unit, and an FFT transformation sub-unit.

The IFFT transformation sub-unit is configured to perform IFFT transformation on an output signal of the linear compensation module.

The norm processing unit is configured to take a modulus of an output signal of the IFFT transformation sub-unit and square the modulus to obtain a norm value.

The multiplication processing unit is configured to calculate a product of the output signal of the IFFT transformation sub-unit, the norm value, and a preset imaginary constant.

The FFT transformation sub-unit is configured to perform FFT transformation on a signal output by the multiplication processing unit.

The summation module is configured to perform summation on the output signals of the linear compensation module and the FFT transformation sub-unit.

An optical signal compensation device, applicable to a polarization multiplexing system, includes:

N compensation modules connected in series;

a first FFT transformation module, connected to an input end of a first compensation module, where the first FFT transformation module is configured to perform Fast Fourier Transformation (FFT) on a first input signal of the first compensation module; and a second FFT transformation module, connected to the input end of the first compensation module, where the second FFT transformation module is configured to perform FFT transformation on a second input signal of the first compensation module;

a first IFFT transformation module, connected to an output end of an Nth compensation module, where the first IFFT transformation module is configured to perform Inverse Fast Fourier Transformation (IFFT) on a first output signal of the Nth compensation module; and a second IFFT transformation module, connected to the output end of the Nth compensation module, where the second IFFT transformation module is configured to perform IFFT transformation on a second output signal of the Nth compensation module.

A compensation module includes:

a linear compensation module, configured to perform dispersion compensation separately on two input signals; and a nonlinear compensation module, including a first IFFT transformation sub-unit, a second IFFT transformation sub-unit, a norm processing unit, an operation unit, a first FFT transformation sub-unit, and a second FFT transformation sub-unit.

The first IFFT transformation sub-unit is configured to perform IFFT transformation on a first output signal of the linear compensation module.

The second IFFT transformation sub-unit is configured to perform IFFT transformation on a second output signal of the linear compensation module.

The norm processing unit is configured to take a modulus of an output signal of the first IFFT transformation sub-unit and square the modulus to obtain a first norm value, and take a modulus of an output signal of the second IFFT transformation sub-unit and square the modulus to obtain a second norm value.

The operation unit is configured to multiply a sum of the first norm value and the second norm value with the output signal of the first IFFT transformation sub-unit and a preset imaginary constant, so as to obtain a first nonlinear compensation output signal; and is configured to multiply the sum of the first norm value and the second norm value with the output signal of the second IFFT transformation sub-unit and the preset imaginary constant, so as to obtain a second nonlinear compensation output signal.

The first FFT transformation sub-unit is configured to perform FFT transformation on the first nonlinear compensation output signal.

The second FFT transformation sub-unit is configured to perform FFT transformation on the second nonlinear compensation output signal.

The compensation module further includes: a first summation module and a second summation module.

The first summation module is configured to perform summation on the first output signal of the linear compensation module and an output signal of the first FFT transformation sub-unit.

The second summation module is configured to perform summation on the second output signal of the linear compensation module and an output signal of the second FFT transformation sub-unit.

An optical signal compensation device, applicable to a single polarization system, includes:

N compensation modules connected in series;

A compensation module includes a linear compensation module, a nonlinear compensation module, and a summation module.

The linear compensation module is configured to perform dispersion compensation on an input signal.

The nonlinear compensation module includes: a norm processing unit and a multiplication processing unit.

The norm processing unit is configured to take a modulus of an output signal of the linear compensation module and square the modulus to obtain a norm value.

The multiplication processing unit is configured to calculate a product of the output signal of the linear compensation module, the norm value, and a preset imaginary constant, and use a calculation result as an output signal of the nonlinear compensation module.

The summation module is configured to perform summation on the output signals of the linear compensation module and the nonlinear compensation module.

An optical signal compensation device, applicable to a polarization multiplexing system, includes:

N compensation modules connected in series.

A compensation module includes:

a linear compensation module, configured to perform dispersion compensation separately on two input signals; and a nonlinear compensation module, including a norm processing unit and a multiplication processing unit.

The norm processing unit is configured to take a modulus of a first output signal of the linear compensation module and square the modulus to obtain a first norm value, and take a modulus of a second output signal of the linear compensation module and square the modulus to obtain a second norm value.

The operation unit is configured to multiply a sum of the first norm value and the second norm value with the first output signal of the linear compensation module and a preset imaginary constant, so as to obtain a first nonlinear compensation output signal of the nonlinear compensation module; and is configured to multiply the sum of the first norm value and the second norm value with the second output signal of the linear compensation module and the preset imaginary constant, so as to obtain a second nonlinear compensation output signal of the nonlinear compensation module.

The compensation module further includes: a first summation module and a second summation module.

The first summation module is configured to perform summation on the first output signal of the linear compensation module and the first nonlinear compensation output signal of the nonlinear compensation module.

The second summation module is configured to perform summation on the second output signal of the linear compensation module and the second nonlinear compensation output signal of the nonlinear compensation module.

It can be seen from the foregoing that, in the embodiments of the present invention, the structure based on the optical signal compensation device performs nonlinear compensation on the optical signal by using a new nonlinear compensation algorithm in the nonlinear compensation module, and during the process of the nonlinear compensation, it is not required to look up a table, thereby increasing the processing speed of the nonlinear compensation, and further reducing the overall processing delay of the optical signal compensation system.

BRIEF DESCRIPTION OF THE DRAWINGS

To make the technical solutions of the embodiments of the present invention or the prior art clearer, the following briefly describes the accompanying drawings used in the description of the embodiments or the prior art. Evidently, the accompanying drawings illustrate some exemplary embodiments of the present invention and persons of ordinary skill in the art may obtain other drawings based on these drawings without creative efforts.

FIG. 2-a is a schematic structural diagram of performing compensation on an optical signal at a receiving end in the manner of digital signal processing in the prior art;

FIG. 2-b is a schematic structural diagram of a specific implementation of the ith stage signal compensation in FIG. 2-a;

FIG. 3-a is a schematic structural diagram of an embodiment of an optical signal compensation device provided in an embodiment of the present invention;

FIG. 3-b is a schematic structural diagram of an embodiment of a nonlinear compensation module provided in an embodiment of the present invention;

FIG. 4-a is a schematic structural diagram of an embodiment of a specific implementation of a linear compensation module provided in an embodiment of the present invention;

FIG. 4-b is a schematic structural diagram of an embodiment of a specific implementation of a nonlinear compensation module provided in an embodiment of the present invention;

FIG. 6-a is a schematic structural diagram of still another embodiment of an optical signal compensation device provided in an embodiment of the present invention;

FIG. 6-b is a schematic structural diagram of another embodiment of a specific implementation of a linear compensation module provided in an embodiment of the present invention;

FIG. 6-c is a schematic structural diagram of another embodiment of a specific implementation of a nonlinear compensation module provided in an embodiment of the present invention;

FIG. 7 is a schematic structural diagram of still another embodiment of an optical signal compensation device provided in an embodiment of the present invention;

FIG. 8-a is a schematic structural diagram of still another embodiment of an optical signal compensation device provided in an embodiment of the present invention;

FIG. 8-b is a schematic structural diagram of another embodiment of a nonlinear compensation module provided in an embodiment of the present invention;

FIG. 9-a is a schematic structural diagram of still another embodiment of a specific implementation of a linear compensation module provided in an embodiment of the present invention;

FIG. 9-b is a schematic structural diagram of still another embodiment of a specific implementation of a nonlinear compensation module provided in an embodiment of the present invention;

FIG. 11-a is a schematic structural diagram of still another embodiment of an optical signal compensation device provided in an embodiment of the present invention;

FIG. 11-b is a schematic structural diagram of still another embodiment of a specific implementation of a linear compensation module provided in an embodiment of the present invention;

FIG. 11-c is a schematic structural diagram of still another embodiment of a specific implementation of a nonlinear compensation module provided in an embodiment of the present invention;

FIG. 14-a is a schematic structural diagram of an embodiment of a compensation module provided in an embodiment of the present invention;

FIG. 14-b is a schematic structural diagram of still another embodiment of a nonlinear compensation module provided in an embodiment of the present invention;

FIG. 18-a is a schematic structural diagram of another embodiment of a compensation module provided in an embodiment of the present invention;

FIG. 18-b is a schematic structural diagram of still another embodiment of a nonlinear compensation module provided in an embodiment of the present invention;

FIG. 21 is a schematic structural diagram of still another embodiment of an optical signal compensation device provided in an embodiment of the present invention;

FIG. 22-a is a schematic structural diagram of still another embodiment of a compensation module provided in an embodiment of the present invention;

FIG. 22-b is a schematic structural diagram of still another embodiment of a nonlinear compensation module provided in an embodiment of the present invention;

FIG. 26-a is a schematic structural diagram of still another embodiment of a compensation module provided in an embodiment of the present invention;

FIG. 26-b is a schematic structural diagram of still another embodiment of a nonlinear compensation module provided in an embodiment of the present invention;

DETAILED DESCRIPTION OF THE EMBODIMENTS

Figure 1:
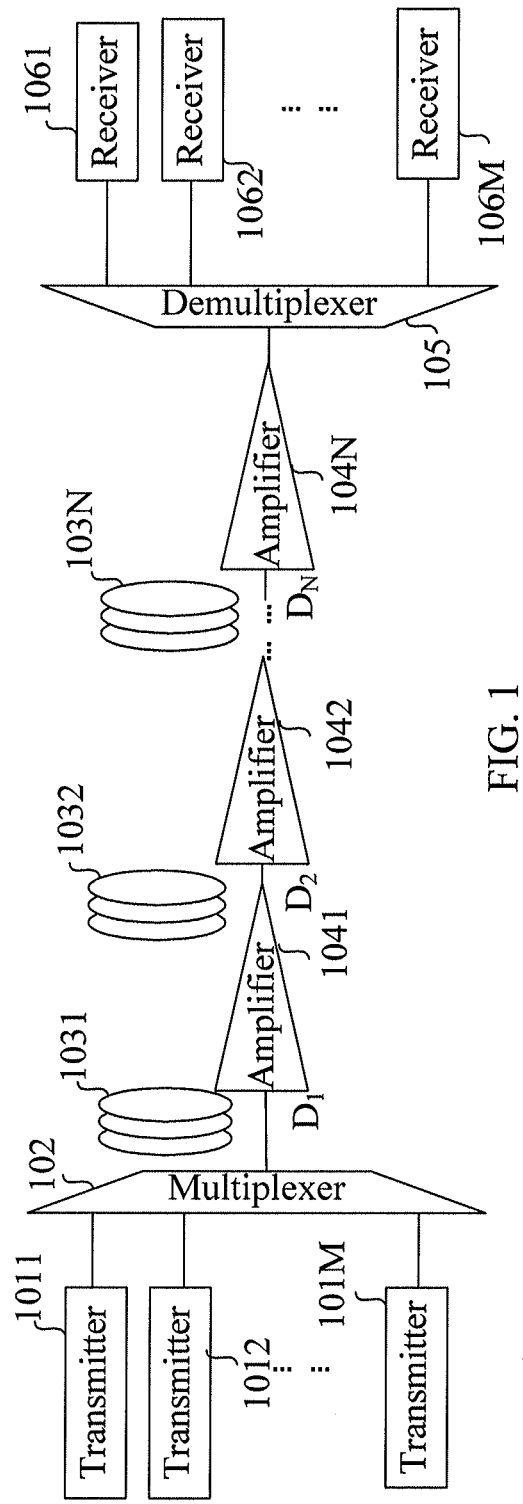
FIG. 1 is a schematic diagram of a typical wavelength division multiplexing transmission system.

Embodiments of the present invention provide an optical signal compensation device.

To make the invention objectives, features, and advantages of the present invention more comprehensible, the following describes the technical solutions of the present invention clearly and completely described in the following with reference to the embodiments and accompanying drawings of the present invention. It is obvious that the embodiments to be described are only a part rather than all of the embodiments of the present invention. Based on the embodiments of the present invention, all other embodiments obtained by persons of ordinary skill in the art without making any creative effort shall fall within the protection scope of the present invention.

The following describes an optical signal compensation device in an embodiment of the present invention. As shown in FIG. 3-a, an optical signal compensation device 300 in the embodiment of the present invention includes:

a linear compensation module 301 and N nonlinear compensation modules 302-1~302-N that are connected in parallel, and a summation module 303.

The optical signal compensation device 300 in the embodiment of the present invention is applicable to a single polarization system, and in the single polarization system, only one polarization signal is transmitted on the optical fiber transmission link. In the embodiment of the present invention, the linear compensation module 301 and the nonlinear compensation modules 302-1~302-N adopt a parallel structure and are independent from one another.

In the embodiment of the present invention, the linear compensation module 301 is configured to perform dispersion compensation on an input signal according to a first compensation dispersion value, where, the first compensation dispersion value equals to the total amount of dispersion caused in the optical fiber transmission link, so as to compensate the dispersion of the whole optical fiber transmission link. The first compensation dispersion value may be a preset value, and may also be a value determined after the system performs detection on the optical fiber transmission link.

In this embodiment, as shown in FIG. 3-b, each nonlinear compensation module includes:

a first dispersion compensation unit 3021, configured to perform dispersion compensation on the input signal according to a second compensation dispersion value;

a norm processing unit 3022, configured to take a modulus of an input signal of the first dispersion compensation unit 3021 and square the modulus to obtain a norm value;

a multiplication processing unit 3023, configured to calculate a product of the output signal of the first dispersion compensation unit 3021, the norm value output by the norm processing unit 3022, and a preset imaginary constant, so as to obtain a nonlinear compensation output signal; and a second dispersion compensation unit 3024, configured to perform dispersion compensation on the nonlinear compensation output signal output by the multiplication processing unit 3023 according to a third compensation dispersion value, and use the signal that has undergone the dispersion compensation as an output signal of the nonlinear compensation module.

In the embodiment of the present invention, a sum of the second compensation dispersion value and the third compensation dispersion value equals to the first compensation dispersion value, that is, the sum of the second compensation dispersion value and the second compensation dispersion value equals to the total amount of dispersion caused in the optical fiber transmission link, and the second compensation dispersion value and the second compensation dispersion value may both be preset values.

The summation module 303 is connected to output ends of the linear compensation module 301 and the nonlinear compensation modules 302-1~302-N, and configured to perform summation on output signals of the linear compensation module 301 and the nonlinear compensation modules 302-1~302-N.

The number of the nonlinear compensation modules included in the optical signal compensation device 300 in the embodiment of the present invention, that is, the value of N, may equal to a total number of optical fiber spans in the optical fiber transmission link, and definitely, N may also be another value, which is not limited here.

In the embodiment of the present invention, the specific implementation of the linear compensation module 301 may be as that shown in FIG. 4-a. The linear compensation module 301 first converts an input signal A into a frequency domain signal by performing FFT transformation, multiplies the frequency domain signal by a frequency domain dispersion compensation function $H_{CD}$, converts the frequency domain signal into a time domain signal through IFFT, and outputs the time domain signal, where, an expression of the $H_{CD}$ is: $\exp(-jD\lambda^2\omega^2/(4\pi c))$, D in the formula indicates a to-be-compensated dispersion value and the value of D is the first compensation dispersion value, $\lambda$ indicates an optical wavelength, $\omega$ indicates a frequency, and c indicates the velocity of light. Specific implementations of a first dispersion compensation unit, norm processing unit, multiplication processing unit and second dispersion compensation unit of the nonlinear compensation module 302-i are shown in FIG. 4-b, being labeled as 401~404, respectively, the first dispersion compensation unit 401 performs dispersion compensation on the input signal A to obtain an output signal B, the norm processing unit 402 and the multiplication processing unit 403 accomplish the nonlinear operation to obtain $-j\gamma B|B|^2$, and the second dispersion compensation unit 404 compensates the residual dispersion, where, the $-j\gamma$ is a preset imaginary constant, expressions of $H_{CD-i-pre}$ and $H_{CD-i-post}$ are: $\exp(-jD_{i-pre}\lambda^2\omega^2/(4\pi c))$ and $\exp(-jD_{i-post}\lambda^2\omega^2/(4\pi c))$, respectively, and $D_{i-pre}$ and $D_{i-post}$ are the second compensation dispersion value and third compensation dispersion value, respectively. During actual application, for an ith nonlinear compensation module, as shown in FIG. 1, assume that D equals to $(D_1+D_2+\ldots+D_N)$, $D_{i-pre}$ may be enabled to be equal to $(D-D_i)$, so as to compensate the dispersion of $(D-D_i)$ through $H_{CD-i-pre}$, and $D_{i-post}$ may be enabled to be equal to $D_i$, so as to compensate the residual dispersion of $D_i$ through $H_{CD-i-post}$.

Figure 5:
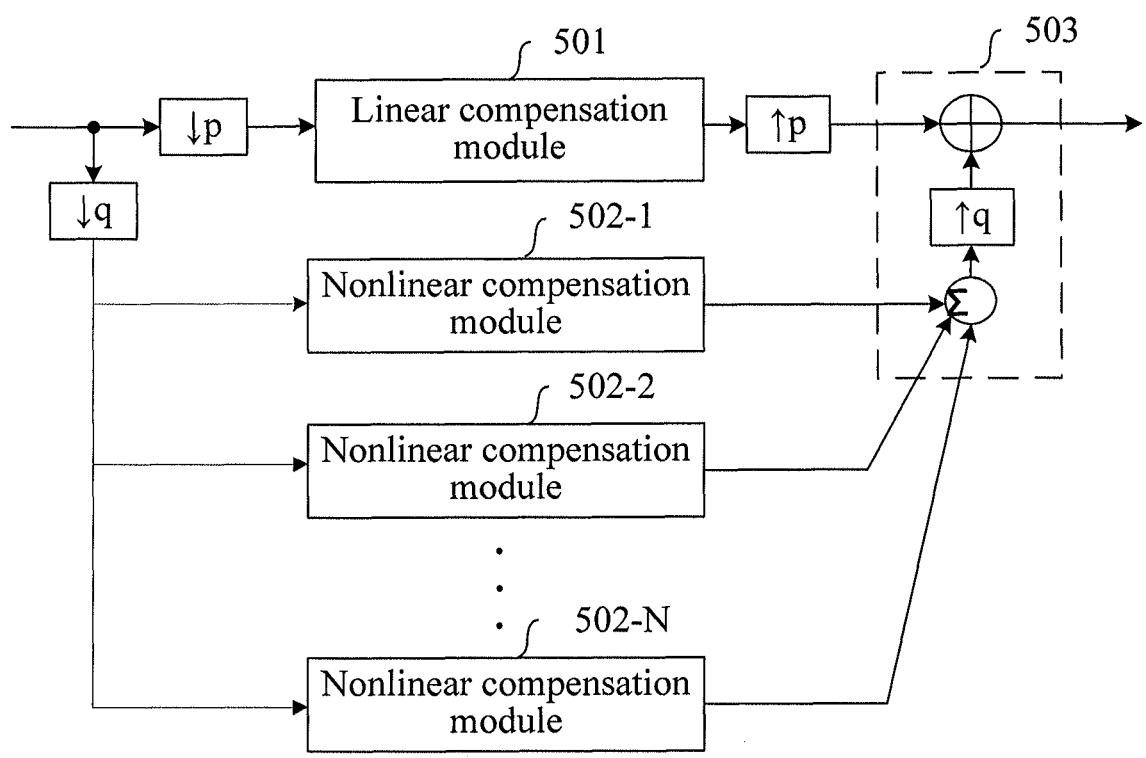
FIG. 5 is a schematic structural diagram of another embodiment of an optical signal compensation device provided in an embodiment of the present invention.

In an application scenario of the embodiment of the present invention, different sampling rates are used to perform sampling processing on a linear compensation part and a nonlinear compensation part, so as to reduce the complexity of implementation. As shown in FIG. 5, a linear compensation module 501, before performing the dispersion compensation, perform downsampling by adopting a first multiple value p on an input signal of the linear compensation module 501, which reduces an original sampling rate, and uses the signal obtained through downsampling as an input signal of the linear compensation module 501 for processing. A summation module 503, before performing summation, restores the original sampling rate through p-multiple upsampling to perform sampling on an output signal of the linear compensation module 501, and uses the sampled signal as an output signal of the linear compensation module 501 for performing summation. A first dispersion compensation unit in nonlinear compensation modules 502-1~502-N, before performing dispersion compensation, perform downsampling by adopting a second multiple value q on an input signal of the first dispersion compensation unit, which reduces an original sampling rate, and uses the signal obtained through downsampling as an input signal of the first dispersion compensation unit for processing, the summation module 503 first accumulates output signals of the nonlinear compensation modules 502-1~502-N, restores the original sampling rate through q-multiple upsampling to perform sampling on the signal obtained performing accumulation, and calculates a sum of the signal obtained through sampling and the output signal of the linear compensation module 501. Definitely, in the embodiment of the present invention, upsampling and downsampling may also be performed only on a linear compensation branch, alternatively, upsampling and downsampling may also be performed only on the N nonlinear compensation branches, which is not limited herein.

In the embodiment of the present invention, the linear compensation module and the nonlinear compensation modules are connected in parallel, and therefore, an FFT transformation module and an IFFT transformation module that are shared by those modules may be disposed at input ends and output ends of the linear compensation module and nonlinear compensation modules of the optical signal compensation device, so as to save consumption of system resources. As shown in FIG. 6-a, an optical signal compensation device 600 includes an FFT transformation module and an IFFT transformation module that are shared by those modules, an FFT transformation module 601 is connected to input ends of a linear compensation module 602 and nonlinear compensation modules 603-1603-N, and an IFFT transformation module 605 is connected to an output end of a summation module 604. In this application scenario, the specific implementation of the linear compensation module 602 is shown in FIG. 6-b, the specific implementation of the nonlinear compensation module 603-i is shown in FIG. 6-c, a first dispersion compensation unit 6031 performs dispersion compensation on an input signal A to obtain an output signal B, a norm processing unit 6032 and a multiplication processing unit 6033 accomplish a nonlinear operation to obtain $-j\gamma B|B|^2$, and a second dispersion compensation unit 6034 compensates the residual dispersion and then outputs the signal. In this application scenario, different sampling rates may also be used to perform sampling processing on a linear compensation part and a nonlinear compensation part. In an optical signal compensation device 700 shown in FIG. 7, an FFT transformation module 701 inputs a signal that has undergone FFT transformation into a linear compensation module 702, the linear compensation module 702, before performing dispersion compensation, perform downsampling by adopting a first multiple value p on an input signal of the linear compensation module 702, which reduces an original sampling rate, and uses the signal obtained through downsampling as an input signal of the linear compensation module 702 for processing. A summation module 704, before performing summation, restores the original sampling rate through p-multiple upsampling to perform sampling on an output signal of the linear compensation module 702, and uses the sampled signal as the output signal of the linear compensation module 702 for performing summation. A first dispersion compensation unit in the nonlinear compensation modules 703-1~703-N, before performing dispersion compensation, perform downsampling by adopting a second multiple value q on an input signal of the first dispersion compensation unit, which reduces an original sampling rate, and uses the signal obtained through downsampling as an input signal of the first dispersion compensation unit for processing. The summation module 704 first accumulates output signals of the nonlinear compensation modules 703-1~703-N, restores the original sampling rate through q-multiple upsampling to perform sampling on the signal obtained performing accumulation, and then calculates a sum of the signal obtained through sampling and the output signal of the linear compensation module 702. The signal obtained through summation is transformed through an IFFT transformation module 705 and then output. In the embodiment of the present invention, the downsampling of each compensation branch may be implemented in the manner of frequency domain zero setting. For example, assume that the FFT transformation module adopts L blocks, if the linear compensation module or nonlinear compensation modules reduce the original sampling rate by m-multiple downsampling, $L*(m-1)/m$ frequency points on a sideband of the frequency domain signal output by the FFT transformation module may be discarded, and the summation module, before performing the summation, restores the original sampling rate in the manner of frequency domain zero fill to implement m-multiple upsampling, that is, $L*(m-1)/m$ 0s are filled on the sideband of the frequency domain output signal (that is, the output signal of the linear compensation module or the output signals of the nonlinear compensation modules). Definitely, in the embodiment of the present invention, upsampling and downsampling may also be performed only on a linear compensation branch, alternatively, upsampling and downsampling may also be performed only on the N nonlinear compensation branches, which is not limited herein.

It can be seen that, in the embodiment of the present invention, the structure based on the optical signal compensation device adopts a new nonlinear compensation algorithm in the nonlinear compensation module to perform nonlinear compensation on the optical signal, in one aspect, in the process of performing the nonlinear compensation, it is not required to look up a table, thereby increasing the processing speed of the nonlinear compensation, and reducing the overall processing delay of the optical signal compensation system, in another aspect, in the optical signal compensation device of the embodiment of the present invention, the linear compensation module and the nonlinear compensation modules are connected in parallel, thereby implementing the parallel processing of a signal, and may further reducing the processing delay of the optical signal compensation system. Further, in the embodiment of the present invention, the linear compensation and the nonlinear compensation are separated, so that a lower processing speed may be used at the nonlinear compensation part, thereby reducing the complexity while ensuring the compensation performance.

The following describes an optical signal compensation device applicable to a polarization multiplexing system in an embodiment of the present invention. As shown in FIG. 8-a, an optical signal compensation device 800 in the embodiment of the present invention includes:

a linear compensation module 801 and N nonlinear compensation modules 802-1~802-N that are connected in parallel, a first summation module 803, and a second summation module 804.

The optical signal compensation device 800 in the embodiment of the present invention is applicable to a polarization multiplexing system, and in the polarization multiplexing system, two independent signals are transferred on an optical fiber transmission link, and the two transmission signals are transmitted in a space quadrature manner. In the embodiment of the present invention, the linear compensation module 801 and the nonlinear compensation modules 802-1~802-N adopt a parallel structure and are independent from one another.

In the embodiment of the present invention, the linear compensation module 801 is configured to perform dispersion compensation separately on two input signals according to a first compensation dispersion value, where, the first compensation dispersion value equals to the total amount of dispersion caused in the optical fiber transmission link, so as to compensate the dispersion of the whole optical fiber transmission link. The first compensation dispersion value may be a preset value, and may also be a value determined after the system performs detection on the optical fiber transmission link.

In this embodiment, as shown in FIG. 8-b, each nonlinear compensation module includes:

a first dispersion compensation unit 8021, configured to perform dispersion compensation on the two input signals according to a second compensation dispersion value;

a norm processing unit 8022, configured to take a modulus of a first output signal of the first dispersion compensation unit 8021 and square the modulus to obtain a first norm value, and take a modulus of a second output signal of the first dispersion compensation unit 8021 and square the modulus to obtain a second norm value;

an operation unit 8023, configured to multiply a sum of the first norm value and the second norm value with the first output signal of the first dispersion compensation unit 8021 and a preset imaginary constant, so as to obtain a first nonlinear compensation output signal; and is configured to multiply the sum of the first norm value and the second norm value with the second output signal of the first dispersion compensation unit 8021 and the preset imaginary constant, so as to obtain a second nonlinear compensation output signal; and a second dispersion compensation unit 8024, configured to perform dispersion compensation separately on the first nonlinear compensation output signal and the second nonlinear compensation output signal that are output by the operation unit 8023 according to a third compensation dispersion value, and use the two signals after the dispersion compensation as a first output signal and a second output signal of the nonlinear compensation module.

In the embodiment of the present invention, a sum of the second compensation dispersion value and the third compensation dispersion value equals to the first compensation dispersion value, that is, the sum of the second compensation dispersion value and the second compensation dispersion value equals to the total amount of dispersion caused in the optical fiber transmission link, and the second compensation dispersion value and the second compensation dispersion value may both be preset values.

The first summation module 803 is connected to first signal output ends of the linear compensation module 801 and the nonlinear compensation modules 802-1~802-N, and configured to perform summation on first output signals of the linear compensation module 802 and the nonlinear compensation modules 801-1~802-N.

The second summation module 804 is connected to second signal output ends of the linear compensation module 801 and the nonlinear compensation modules 802-1~802-N, and configured to perform summation on second output signals of the linear compensation module 802 and the nonlinear compensation modules 801-1~802-N.

The number of the nonlinear compensation modules included in the optical signal compensation device 800 in the embodiment of the present invention, that is, the value of N, may equal to a total number of optical fiber spans in the optical fiber transmission link, and definitely, N may also be another value, which is not limited here.

In the embodiment of the present invention, the specific implementation of the linear compensation module 801 may be as that shown in FIG. 9-a. the linear compensation module 801 first converts input signals $A_x$ and $A_y$ into two frequency domain signals by performing FFT transformation, multiplies the two frequency domain signals respectively by a frequency domain dispersion compensation function $H_{CD}$, converts the two frequency domain signals into two time domain signals through IFFT, and outputs the two time domain signals, where, an expression of the $H_{CD}$ is: $\exp(-jD\lambda^2\omega^2/(4\pi c))$, D in the formula indicates a to-be-compensated dispersion value and the value of D is the first compensation dispersion value, $\lambda$ indicates an optical wavelength, $\omega$ indicates a frequency, and c indicates the velocity of light. Specific implementations of a first dispersion compensation unit, norm processing unit, operation unit and second dispersion compensation unit of the nonlinear compensation module 802-i are shown in FIG. 9-b, being labeled as 901~904, respectively, a first dispersion compensation unit 901 performs dispersion compensation separately on the two input signals $A_x$ and $A_y$ to obtain two output signals $B_x$ and $B_y$, a norm processing unit 902 and an operation unit 903 accomplish the nonlinear operation to obtain $-j\gamma B_x(|Bx|^2+|By|^2)$ and $-j\gamma B_y(|Bx|^2+|By|^2)$, and a second dispersion compensation unit 904 compensates the residual dispersion, where, the $-j\gamma$ is a preset imaginary constant, expressions of $H_{CD-i-pre}$ and $H_{CD-i-post}$ are: $\exp(-jD_{i-pre}\lambda^2\omega^2/(4\pi c))$ and $\exp(-jD_{i-post}\lambda^2\omega^2/(4\pi c))$, respectively, and $D_{i-pre}$ and $D_{i-post}$ are the second compensation dispersion value and third compensation dispersion value, respectively. During actual application, for an ith nonlinear compensation module, as shown in FIG. 1, assume that D equals to $(D_1+D_2+\ldots+D_N)$, $D_{i-pre}$ may be enabled to be equal to $(D-D_i)$, so as to compensate the dispersion of $(D-D_i)$ through $H_{CD-i-pre}$, and $D_{i-post}$ may be enabled to be equal to $D_i$, so as to compensate the residual dispersion of $D_i$ through $F_{CD-i-post}$.

Figure 10:
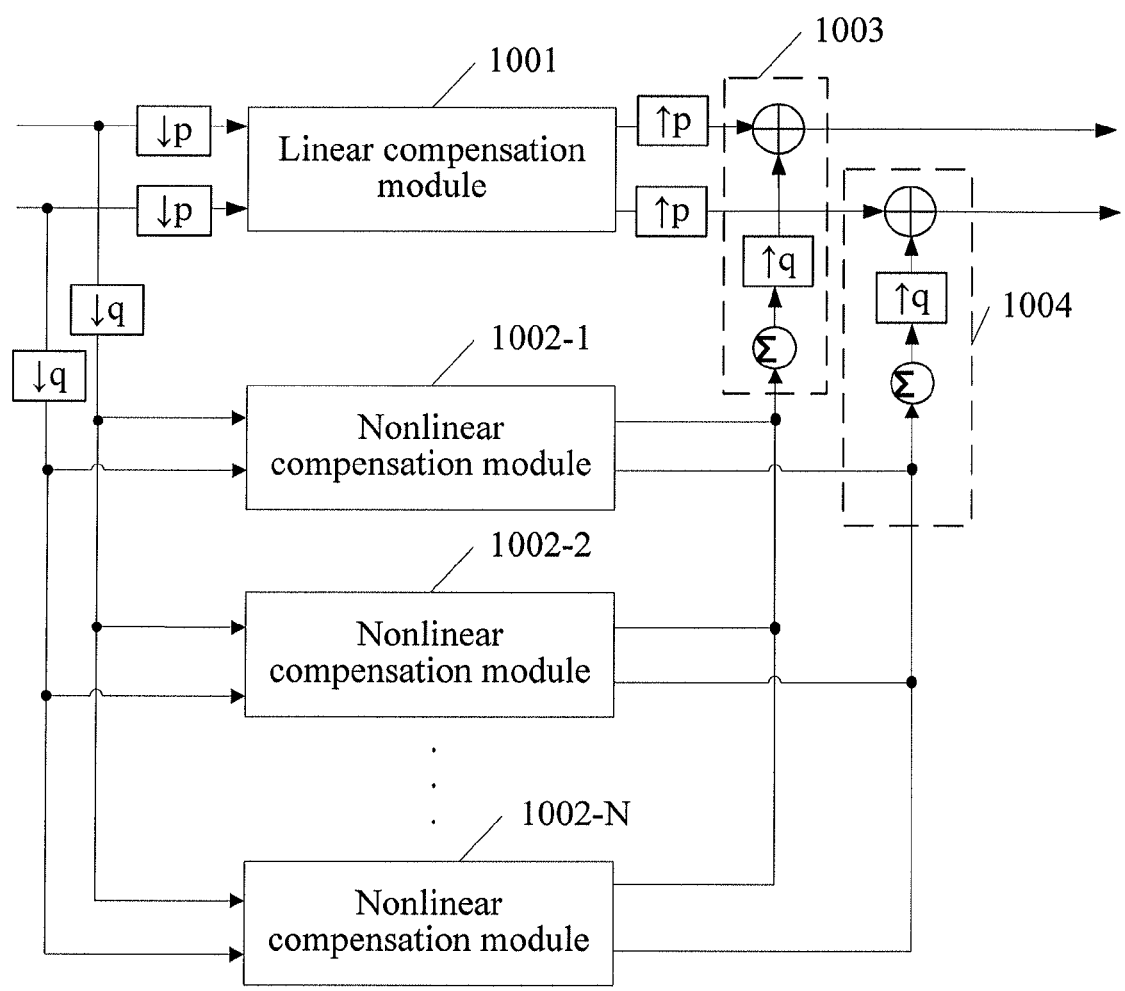
FIG. 10 is a schematic structural diagram of still another embodiment of an optical signal compensation device provided in an embodiment of the present invention.

In an application scenario of the embodiment of the present invention, different sampling rates are used to perform sampling processing on a linear compensation part and a nonlinear compensation part, so as to reduce the complexity of implementation. As shown in FIG. 10, a linear compensation module 1001, before performing the dispersion compensation separately on the two input signals, perform downsampling by adopting a first multiple value p on the two input signals of the linear compensation module 1001, which reduces an original sampling rate, and uses the two signals obtained through downsampling as two input signals of the linear compensation module 1001 for processing. A first summation module 1003 and a second summation module 1004, before performing summation, restore the original sampling rate through p-multiple upsampling to perform sampling on output signals of the linear compensation module 1001, and use the sampled signals as the output signals of the linear compensation module 1001 for performing summation. A first dispersion compensation unit in the nonlinear compensation modules 1002-1~1002-N, before performing dispersion compensation, separately perform downsampling by adopting a second multiple value q on two input signals of the first dispersion compensation unit, which reduces an original sampling rate, and uses the two signals obtained through downsampling as two input signals of the first dispersion compensation unit for processing. The first summation module 1003 and the second summation module 1004 respectively accumulate output signals of the nonlinear compensation modules 1002-1~1002-N, restore the original sampling rate through q-multiple upsampling to perform sampling on the signals obtained performing accumulation, and calculates a sum of the signals obtained through sampling and the output signal of the linear compensation module 1001. Definitely, in the embodiment of the present invention, upsampling and downsampling may also be performed only on a linear compensation branch, alternatively, upsampling and downsampling may also be performed only on the N nonlinear compensation branches, which is not limited herein.

Figure 12:
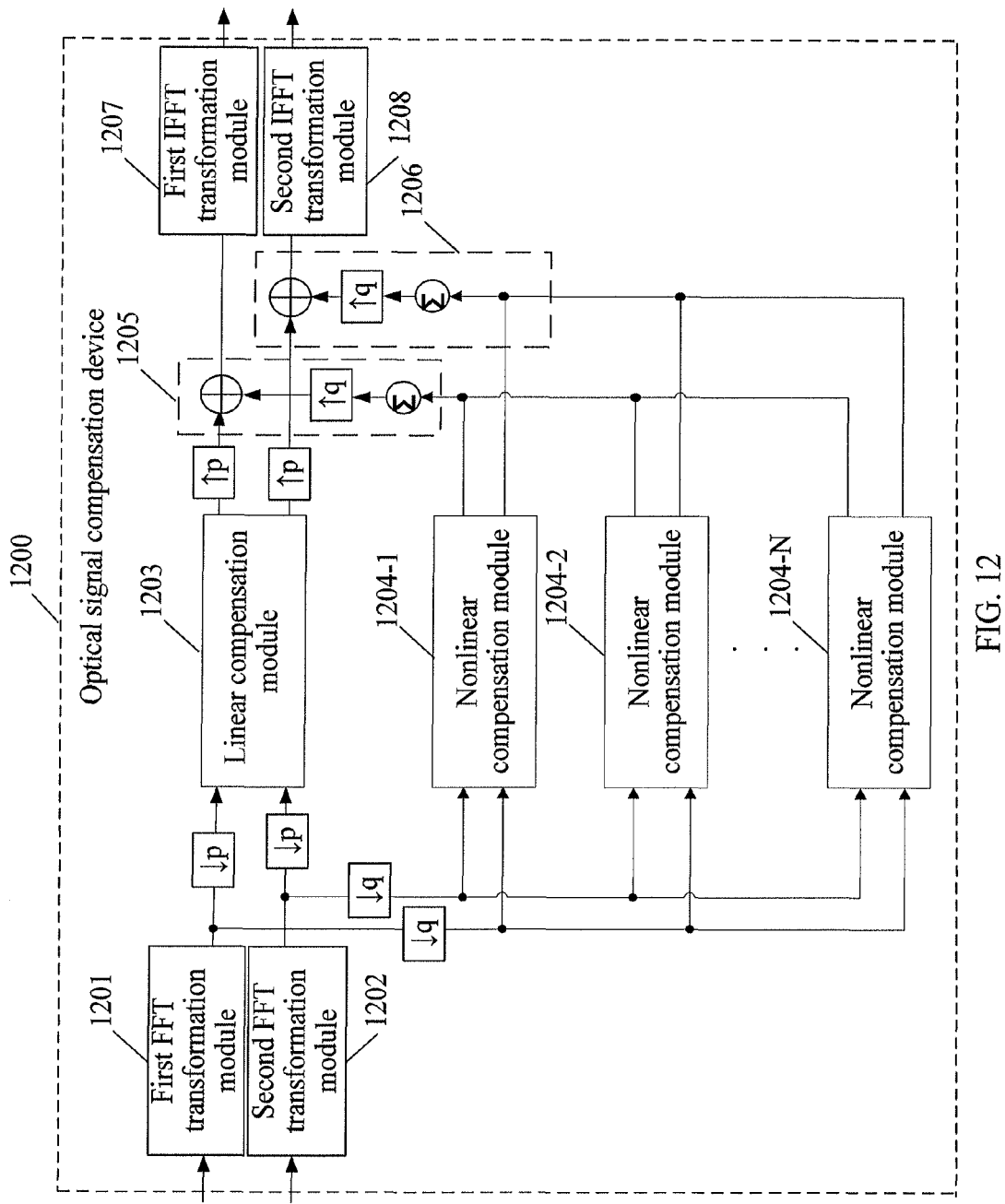
FIG. 12 is a schematic structural diagram of still another embodiment of an optical signal compensation device provided in an embodiment of the present invention.

In the embodiment of the present invention, the linear compensation module and the nonlinear compensation modules are connected in parallel, and therefore, an FFT transformation module and an IFFT transformation module that are shared by those modules may be disposed at input ends and output ends of the linear compensation module and nonlinear compensation modules of the optical signal compensation device, so as to save consumption of system resources. FIG. 11-a shows an optical signal compensation device 1100 includes a first FFT transformation module, a second FFT transformation module, a first IFFT transformation module, and a second IFFT transformation module that are shared by those modules. A first FFT transformation module 1101 and a second FFT transformation module 1102 are connected to input ends of a linear compensation module 1103 and nonlinear compensation modules 1104-1~1104-N, so as to perform FFT transformation on the first input signal and second input signal of the linear compensation module 1103 and the first dispersion compensation unit of the linear compensation module 1104-1~1104-2, a first IFFT transformation module 1107 is connected to an output end of a first summation module 1105, and a second IFFT transformation module 1108 is connected to an output end of a second summation module 1106. In the embodiment of the present invention, the specific implementation of the linear compensation module 1103 is shown in FIG. 11-b, and the specific implementation of the nonlinear compensation module 1104-i is shown in FIG. 11-c. In this application scenario, different sampling rates may also be used to perform sampling processing on a linear compensation part and a nonlinear compensation part, in an optical signal compensation device 1200 shown in FIG. 12, a first FFT transformation module 1201 and a second FFT transformation module 1202 input signals after FFT transformation into a linear compensation module 1203, the linear compensation module 1203, before performing dispersion compensation, perform downsampling by adopting a first multiple value p on the input signal, which reduces an original sampling rate, and uses the signal obtained through downsampling as an input signal of the linear compensation module 1203 for processing. A first summation module 1205 and a second summation module 1206, before performing summation, restore the original sampling rate through p-multiple upsampling to perform sampling on the output signal of the linear compensation module 1203, and uses the sampled signal as the output signal of the linear compensation module 1203 for performing summation. A first dispersion compensation unit in the nonlinear compensation modules 1204-1~1204-N, before performing dispersion compensation, perform downsampling by adopting a second multiple value q on an input signal of the first dispersion compensation unit, which reduces an original sampling rate, and uses the signal obtained through downsampling as an input signal of the first dispersion compensation unit for processing. The first summation module 1205 first accumulates first output signals of the nonlinear compensation modules 1204-1~1204-N, restores the original sampling rate through q-multiple upsampling to perform sampling on the signal obtained performing accumulation, and performs summation on the signal obtained through sampling with the first output signal of the linear compensation module 1203. The signal obtained through summation is transformed through a first IFFT transformation module 1207 and then output. The second summation module 1206 first accumulates second output signals of the nonlinear compensation modules 1204-1~1204-N, restores the original sampling rate through q-multiple upsampling to perform sampling on the signal obtained performing accumulation, and performs summation on the signal obtained through sampling with the second output signal of the linear compensation module 1203. The signal obtained through summation is transformed through a second IFFT transformation module 1208 and then output. In the embodiment of the present invention, the downsampling of each compensation branch may be implemented in the manner of frequency domain zero setting. For example, assume that the first FFT transformation module and the second FFT transformation module adopt L blocks, if the linear compensation module or nonlinear compensation modules reduce the original sampling rate by m-multiple downsampling, $L*(m-1)/m$ frequency points on sidebands of the frequency domain signals output by the first FFT transformation module and the second FFT transformation module may be discarded. The first summation module and the second summation module, before performing the summation, restore the original sampling rate in the manner of frequency domain zero fill to implement m-multiple upsampling, that is, $L*(m-1)/m$ 0s are filled on the sideband of the frequency domain output signal (that is, the output signal of the linear compensation module or the output signals of the nonlinear compensation modules). Definitely, in the embodiment of the present invention, upsampling and downsampling may also be performed only on a linear compensation branch, alternatively, upsampling and downsampling may also be performed only on the N nonlinear compensation branches, which is not limited herein.

It can be seen that, in the embodiment of the present invention, the structure based on the optical signal compensation device adopts a new nonlinear compensation algorithm in the nonlinear compensation module to perform nonlinear compensation on the optical signal, in one aspect, in the process of performing the nonlinear compensation, it is not required to look up a table, thereby increasing the processing speed of the nonlinear compensation, and reducing the overall processing delay of the optical signal compensation system, in another aspect, in the optical signal compensation device of the embodiment of the present invention, the linear compensation module and the nonlinear compensation modules are connected in parallel, thereby implementing the parallel processing of a signal, and may further reducing the processing delay of the optical signal compensation system. Further, in the embodiment of the present invention, the linear compensation and the nonlinear compensation are separated, so that a lower processing speed may be used at the nonlinear compensation part, thereby reducing the complexity while ensuring the compensation performance.

Figure 13:
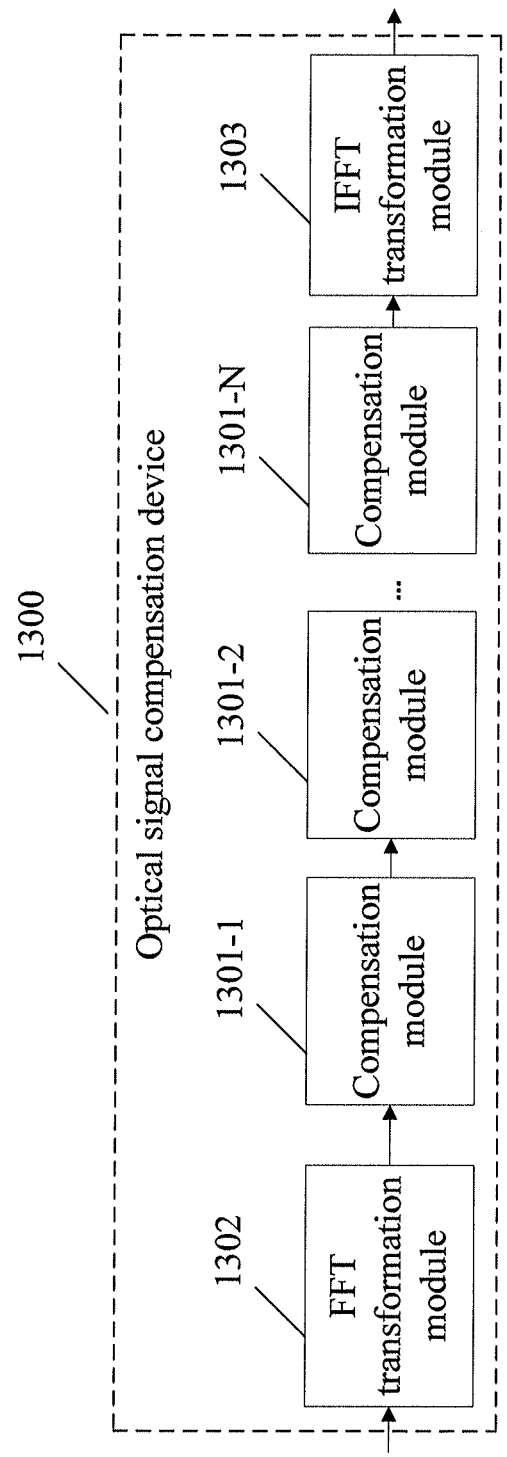
FIG. 13 is a schematic structural diagram of still another embodiment of an optical signal compensation device provided in an embodiment of the present invention.

The following describes an optical signal compensation device in an embodiment of the present invention is described. As shown in FIG. 13, an optical signal compensation device 1300 in the embodiment of the present invention includes:

N compensation modules 1301-1~1301-N connected in series;

an FFT transformation module 1302, connected to an input end of the compensation module 1301-1, and configured to perform FFT transformation on an input signal of the compensation module 1301-1; and an IFFT transformation module 1303, connected to an output end of the compensation module 1301-N, and configured to perform IFFT transformation on an output signal of the compensation module 1301-N.

In the embodiment of the present invention as shown in FIG. 14-a, each compensation module includes a linear compensation module 1401, a nonlinear compensation module 1402, and a summation module 1403.

The linear compensation module 1401 is configured to perform dispersion compensation on an input signal.

As shown in FIG. 14-b, the nonlinear compensation module 1402 includes:

an IFFT transformation sub-unit 14021, configured to perform IFFT transformation on an output signal of the linear compensation module 1401;

a norm processing unit 14022, configured to take a modulus of an output signal of the IFFT transformation sub-unit 14021 and square the modulus to obtain a norm value;

a multiplication processing unit 14023, configured to calculate a product of the output signal of the IFFT transformation sub-unit 14021, the norm value output by the norm processing unit 14022, and a preset imaginary constant; and an FFT transformation sub-unit 14024, configured to perform FFT transformation on a signal output by the multiplication processing unit 14023.

The summation module 1403 is used to perform summation on the output signals of the linear compensation module 1401 and the FFT transformation sub-unit 14024.

In the actual application, a different dispersion value may be preset for each compensation module to implement compensation on the dispersion caused by a different optical fiber span of the optical fiber transmission link. Definitely, a dispersion value of each compensation module may also be determined after the system performs detection on the optical fiber transmission link, which is not limited herein. The number of the compensation modules included in the optical signal compensation device in the embodiment of the present invention, that is, the value of N, may equal to a total number of optical fiber spans in the optical fiber transmission link, and definitely, N may also be another value, which is not limited herein.

Figure 15:
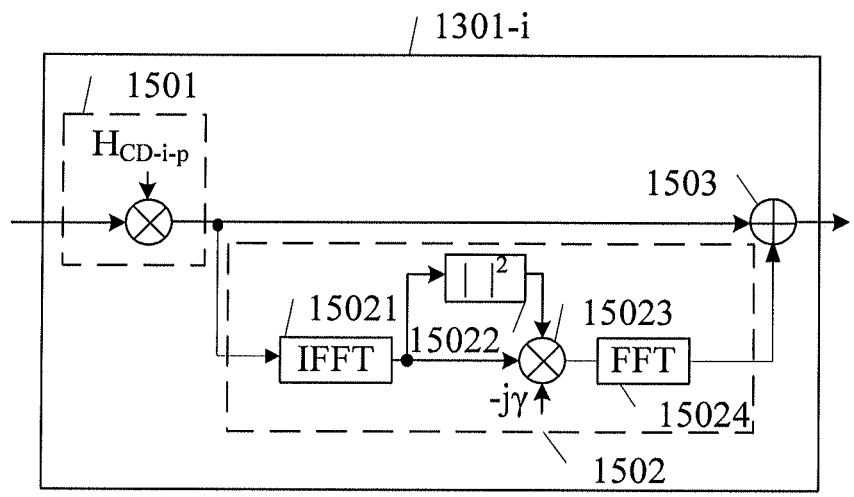
FIG. 15 is a schematic structural diagram of an embodiment of a specific implementation of a compensation module provided in an embodiment of the present invention.

The specific implementation of the ith stage compensation module 1301-i is shown in FIG. 15, a linear compensation module 1501 multiplies an input signal by a frequency domain dispersion compensation function $H_{CD\text{-}i\text{-}p}$ and then outputs the signal to a nonlinear compensation module 1502, the nonlinear compensation module 1502 converts the input frequency domain signal into a time domain signal through an IFFT transformation sub-unit 15021, a norm processing unit 15022 and a multiplication processing unit 15023 accomplish a nonlinear operation and then output the time domain signal to an FFT transformation sub-unit 15024, a summation module 1503 performs summation on output signals of the linear compensation module 1501 and the FFT transformation sub-unit 15024 and then outputs the signal that has undergone summation. If the compensation module 1301-i is not the last compensation module in the optical signal compensation device, the signal output by the summation module 1503 is transferred to a next stage compensation module, and if the compensation module 1301-i is the last compensation module in the optical signal compensation device, the signal output by the summation module 1503 is transferred to the IFFT transformation module of the optical signal compensation device for processing. In the drawing, the $-j\gamma$ is a preset imaginary constant, an expression of $H_{CD\text{-}i\text{-}p}$ is: $\exp(-jD_{i\text{-}p}\lambda^2\omega^2/(4\pi c))$, $\lambda$ in the formula indicates an optical wavelength, $\omega$ indicates a frequency, c indicates the velocity of light, and $D_{i\text{-}p}$ indicates a to-be-compensated dispersion value of the ith stage compensation module. In an actual application, a D value of each stage compensation module may be determined through presetting, for example, $D_{1\text{-}p}$ of the first stage compensation module may be enabled to be equal to $D_N$ in FIG. 1, $D_{2\text{-}p}$ of the second stage compensation module may be enabled to be equal to $D_{N\text{-}1}$ in FIG. 1, and $D_{N\text{-}p}$ of the Nth stage compensation module may be enabled to be equal to $D_1$ in FIG. 1.

Figure 16:
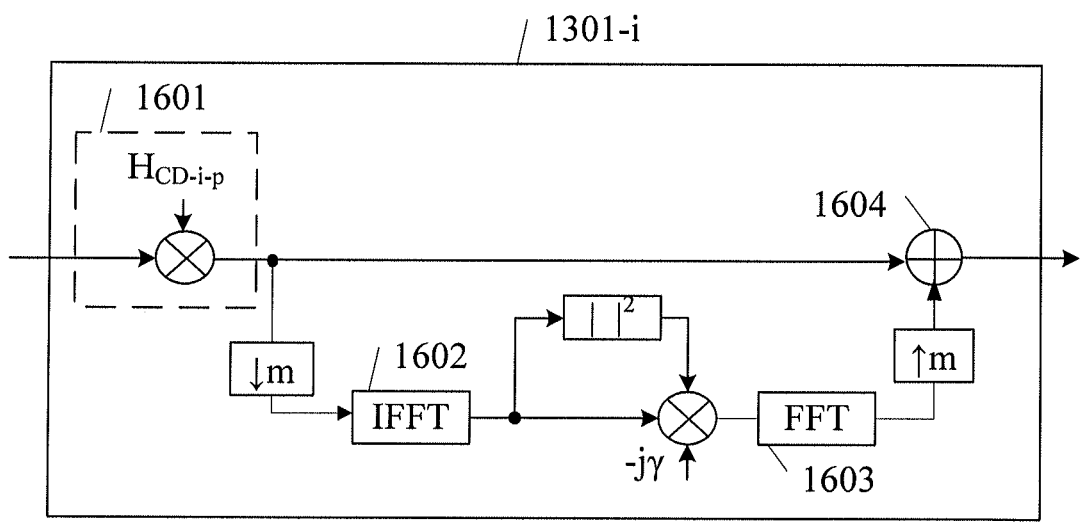
FIG. 16 is a schematic structural diagram of another embodiment of a specific implementation of a compensation module provided in an embodiment of the present invention.

In an application scenario of the embodiment of the present invention, different sampling rates are used to perform sampling processing on a linear compensation part and a nonlinear compensation part, so as to reduce the complexity of implementation. FIG. 16 shows a compensation module 1301-i adopting different sampling rates. An IFFT transformation sub-unit 1602, before performing IFFT transformation, perform downsampling by adopting a preset multiple value m on a signal output by a linear compensation module 1601, which reduces an original sampling rate, and uses the signal obtained through downsampling as an output signal of the linear compensation module 1601 for performing IFFT transformation. A summation module 1604, before performing summation, restores the original sampling rate through m-multiple upsampling to perform sampling on an output signal of an FFT transformation sub-unit 1603, and uses the signal obtained through sampling as the output signal of the FFT transformation sub-unit 1603 for performing summation. In the embodiment of the present invention, the downsampling of each compensation branch may be implemented in the manner of frequency domain zero setting. For example, assume that the FFT transformation module adopts L blocks, if the nonlinear compensation module reduces the original sampling rate by m-multiple downsampling, $L*(m-1)/m$ frequency points on a sideband of the frequency domain signal output by the FFT transformation module may be discarded, and the summation module, before performing the summation, restores the original sampling rate in the manner of frequency domain zero fill to implement m-multiple upsampling, that is, $L*(m-1)/m$ 0s are filled on the sideband of the frequency domain output signal (that is, the output signal of the FFT transformation sub-unit).

It can be seen from the foregoing that, in the embodiments of the present invention, the structure based on the optical signal compensation device performs nonlinear compensation on the optical signal by using a new nonlinear compensation algorithm in the nonlinear compensation module, and during the process of the nonlinear compensation, it is not required to look up a table, thereby increasing the processing speed of the nonlinear compensation, and further reducing the overall processing delay of the optical signal compensation system. Further, the linear compensation and the nonlinear compensation are separated, so that a lower processing speed may be used at the nonlinear compensation part, thereby reducing the complexity while ensuring the compensation performance.

Figure 17:
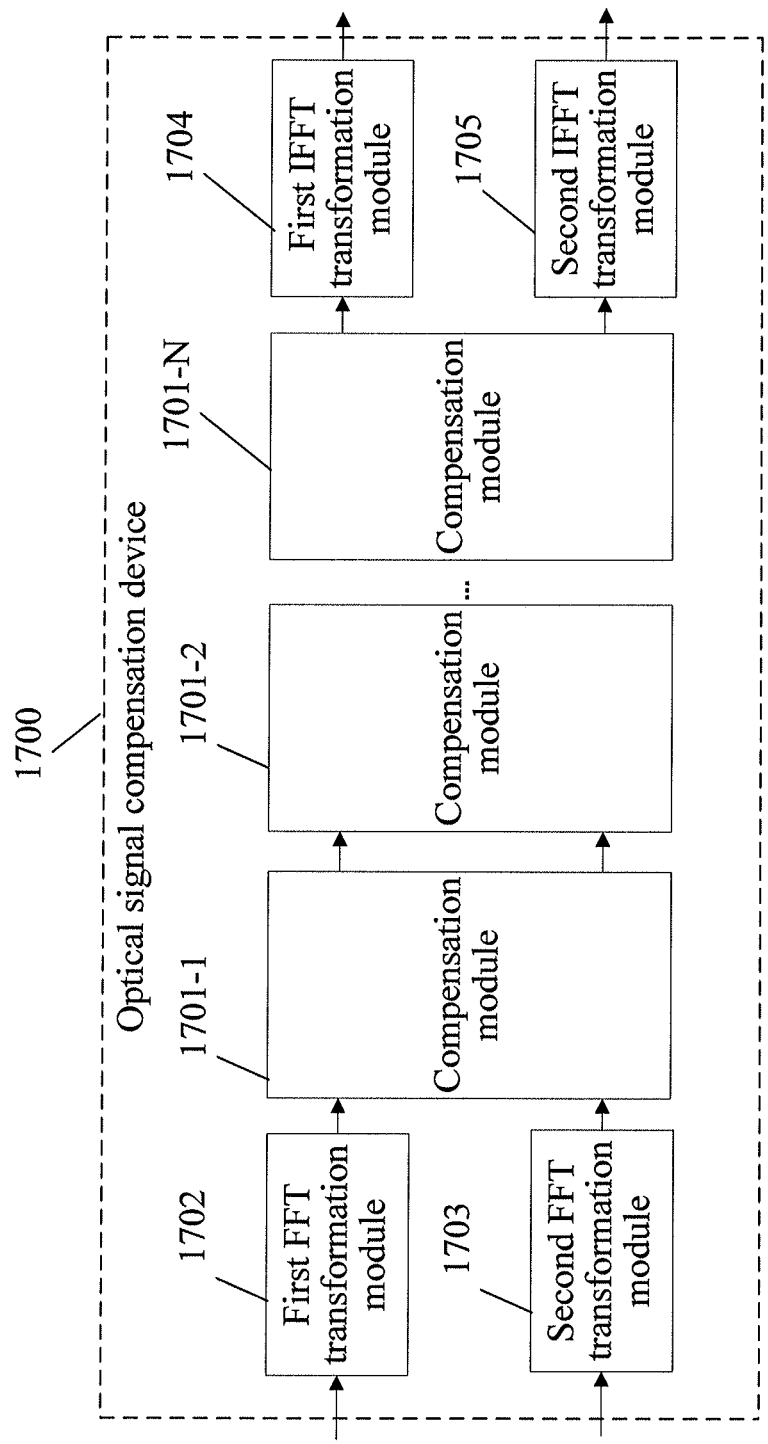
FIG. 17 is a schematic structural diagram of still another embodiment of an optical signal compensation device provided in an embodiment of the present invention.

The following describes an optical signal compensation device applicable to a polarization multiplexing system in an embodiment of the present invention. As shown in FIG. 17, an optical signal compensation device 1700 in the embodiment of the present invention includes:

N compensation modules 1701-1~1701-N connected in series;

a first FFT transformation module 1702, connected to an input end of the compensation module 1701-1, and configured to perform FFT transformation on a first input signal of the compensation module 1701-1;

a second FFT transformation module 1703, connected to the input end of the compensation module 1701-1, and configured to perform FFT transformation on a second input signal of the compensation module 1701-1;

a first IFFT transformation module 1704, connected to an output end of the compensation module 1701-N, and configured to perform IFFT transformation on a first output signal of the compensation module 1701-N; and a second IFFT transformation module 1705, connected to the output end of the compensation module 1701-N, and configured to perform IFFT transformation on a second output signal of the compensation module 1701-N.

In the embodiment of the present invention as shown in FIG. 18-a, each compensation module includes a linear compensation module 1801, a nonlinear compensation module 1802, a first summation module 1803 and a second summation module 1804.

The linear compensation module 1801 is configured to perform dispersion compensation separately on two input signals.

As shown in FIG. 18-b, the nonlinear compensation module 1802 includes:

a first IFFT transformation sub-unit 18021, configured to perform IFFT transformation on a first output signal of the linear compensation module 1801;

a second IFFT transformation sub-unit 18022, configured to perform IFFT transformation on a second output signal of the linear compensation module 1801;

a norm processing unit 18023, configured to take a modulus of an output signal of the first IFFT transformation sub-unit 18021 and square the modulus to obtain a first norm value, and take a modulus of an output signal of the second IFFT transformation sub-unit 18022 and square the modulus to obtain a second norm value;

an operation unit 18024, configured to multiply a sum of the first norm value and the second norm value with the output signal of the first IFFT transformation sub-unit 18021 and a preset imaginary constant, so as to obtain a first nonlinear compensation output signal; and is configured to multiply the sum of the first norm value and the second norm value with the output signal of the second IFFT transformation sub-unit 18022 and the preset imaginary constant, so as to obtain a second nonlinear compensation output signal;

a first FFT transformation sub-unit 18025, configured to perform FFT transformation on the first nonlinear compensation output signal; and a second FFT transformation sub-unit 18026, configured to perform FFT transformation on the second nonlinear compensation output signal.

The first summation module 1803 is configured to perform summation on the first output signal of the linear compensation module 1801 and the output signal of the first FFT transformation sub-unit 18025.

The second summation module 1804 is configured to perform summation on the second output signal of the linear compensation module 1801 and the output signal of the second FFT transformation sub-unit 18026.

In the actual application, a different dispersion value may be preset for each compensation module to implement compensation on the dispersion caused by a different optical fiber span of the optical fiber transmission link. Definitely, a dispersion value of each compensation module may also be determined after the system performs detection on the optical fiber transmission link, which is not limited herein. The number of the compensation modules included in the optical signal compensation device in the embodiment of the present invention, that is, the value of N, may equal to a total number of optical fiber spans in the optical fiber transmission link, and definitely, N may also be another value, which is not limited herein.

Figure 19:
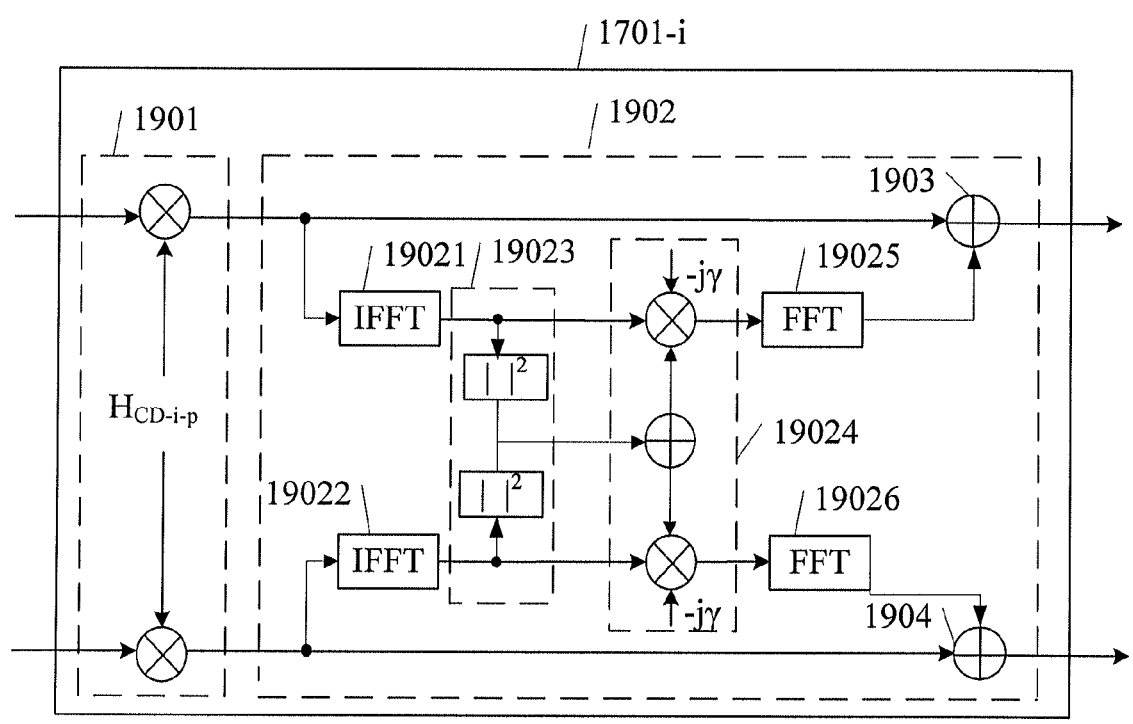
FIG. 19 is a schematic structural diagram of still another embodiment of a specific implementation of a compensation module provided in an embodiment of the present invention.

The specific implementation of the ith stage compensation module 1701-$i$ is shown in FIG. 19, a linear compensation module 1901 multiplies two input signals respectively by a frequency domain dispersion compensation function $H_{CD\text{-}i\text{-}p}$ and then outputs the signals to a nonlinear compensation module 1902, the nonlinear compensation module 1902 converts the input frequency domain signals into time domain signals through a first IFFT transformation sub-unit 19021 and a second IFFT transformation sub-unit 19022, a norm processing unit 19023 and an operation unit 19024 accomplish a nonlinear operation and then output the two output signals respectively to a first FFT transformation sub-unit 19025 and a second FFT transformation sub-unit 19026, a first summation module 1903 and a second summation module 1904 perform summation on the two signals and then output the signals. If the compensation module 1701-$i$ is not the last compensation module in the optical signal compensation device, the signals output by the first summation module 1903 and the second summation module 1904 are transferred to a next stage compensation module, and if the compensation module 1701-$i$ is the last compensation module in the optical signal compensation device, the signals output by the first summation module 1903 and the second summation module 1904 are transferred to the IFFT transformation module of the optical signal compensation device for processing. In the drawing, the Hy is a preset imaginary constant, an expression of $H_{CD\text{-}i\text{-}p}$ is: $\exp(-jD_{i\text{-}p}\lambda^2\omega^2/(4\pi c))$, $\lambda$ in the formula indicates an optical wavelength, $\omega$ indicates a frequency, c indicates the velocity of light, and $D_{i\text{-}p}$ indicates a to-be-compensated dispersion value of the ith stage compensation module. In an actual application, a D value of each stage compensation module may be determined through presetting, for example, $D_{1\text{-}p}$ of the first stage compensation module may be enabled to be equal to $D_N$ in FIG. 1, $D_{2\text{-}p}$ of the second stage compensation module may be enabled to be equal to $D_{N\text{-}1}$ in FIG. 1, and $D_{N\text{-}p}$ of the Nth stage compensation module may be enabled to be equal to $D_1$ in FIG. 1.

Figure 20:
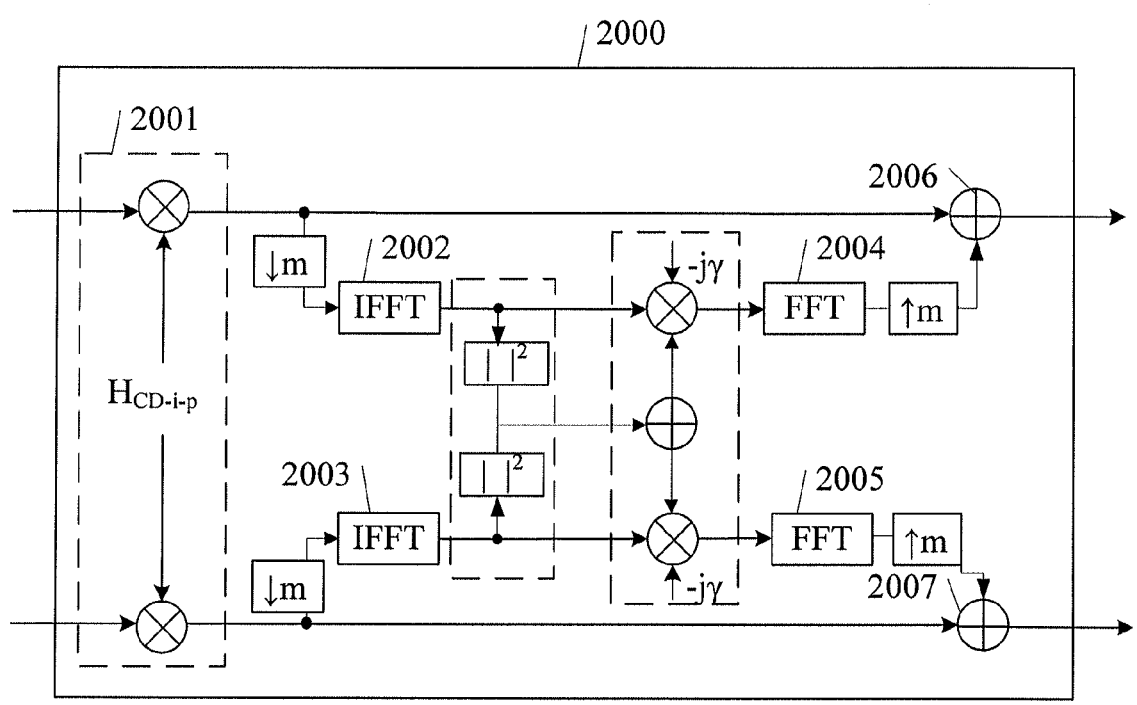
FIG. 20 is a schematic structural diagram of still another embodiment of a specific implementation of a compensation module provided in an embodiment of the present invention.

In an application scenario of the embodiment of the present invention, different sampling rates are used to perform sampling processing on a linear compensation part and a nonlinear compensation part, so as to reduce the complexity of implementation. FIG. 20 shows a compensation module 2000 adopting different sampling rates. A first IFFT transformation sub-unit 2002 and a second IFFT transformation sub-unit 2003, before performing IFFT transformation, perform downsampling by adopting a preset multiple value m on a signal output by a linear compensation module 2001, which reduces an original sampling rate, and uses the signal obtained through downsampling as the output signal of the linear compensation module 2001 for performing IFFT transformation. A first summation module 2006 and a second summation module 2007, before performing summation, restore the original sampling rate through m-multiple upsampling to perform sampling on output signals of a first FFT transformation sub-unit 2004 and a second FFT transformation sub-unit 2005, and use the sampled signals as the output signals of the first FFT transformation sub-unit 2004 and the second FFT transformation sub-unit 2005 respectively for performing summation. In the embodiment of the present invention, the downsampling of each compensation branch may be implemented in the manner of frequency domain zero setting. For example, assume that the first FFT transformation module and the second FFT transformation module adopt L blocks, if the nonlinear compensation module reduces the original sampling rate by m-multiple downsampling, L*(m−1)/m frequency points on sidebands of the frequency domain signals output by the first FFT transformation module and the second FFT transformation module may be discarded. The first summation module and the second summation module, before performing the summation, restore the original sampling rate in the manner of frequency domain zero fill to implement m-multiple upsampling, that is, L*(m−1)/m 0s are filled on the sidebands of the frequency domain output signals (that is, the output signals of the first FFT transformation module and the second FFT transformation module).

It can be seen from the foregoing that, in the embodiments of the present invention, the structure based on the optical signal compensation device performs nonlinear compensation on the optical signal by using a new nonlinear compensation algorithm in the nonlinear compensation module, and during the process of the nonlinear compensation, it is no longer required to look up a table, thereby increasing the processing speed of the nonlinear compensation, and further reducing the overall processing delay of the optical signal compensation system. Further, the linear compensation and the nonlinear compensation are separated, so that a lower processing speed may be used at the nonlinear compensation part, thereby reducing the complexity while ensuring the compensation performance.

The following describes an optical signal compensation device applicable to a single polarization system in an embodiment of the present invention is described. As shown in FIG. 21, an optical signal compensation device 2100 in the embodiment of the present invention includes:

N compensation modules 2101-1~2101-N connected in series.

In the embodiment of the present invention as shown in FIG. 22-a, each compensation module includes a linear compensation module 2201, a nonlinear compensation module 2202, and a summation module 2203.

The linear compensation module 2201 is configured to perform dispersion compensation on an input signal.

As shown in FIG. 22-b, the nonlinear compensation module 2202 includes:

a norm processing unit 22021, configured to take a modulus of an output signal of the linear compensation module 2201 and square the modulus to obtain a norm value;

a multiplication processing unit 22022, configured to calculate a product of the output signal of the linear compensation module 2201, the norm value output by the norm processing unit 22021, and a preset imaginary constant, and use a calculation result as an output signal of the nonlinear compensation module 2202; and a summation module 2203, configured to perform summation on the output signals of the linear compensation module 2201 and the non linear compensation module 2202.

In the actual application, a different dispersion value may be preset for each compensation module to implement compensation on the dispersion caused by a different optical fiber span of the optical fiber transmission link. Definitely, a dispersion value of each compensation module may also be determined after the system performs detection on the optical fiber transmission link, which is not limited herein. The number of the compensation modules included in the optical signal compensation device in the embodiment of the present invention, that is, the value of N, may equal to a total number of optical fiber spans in the optical fiber transmission link, and definitely, N may also be another value, which is not limited herein.

Figure 23:
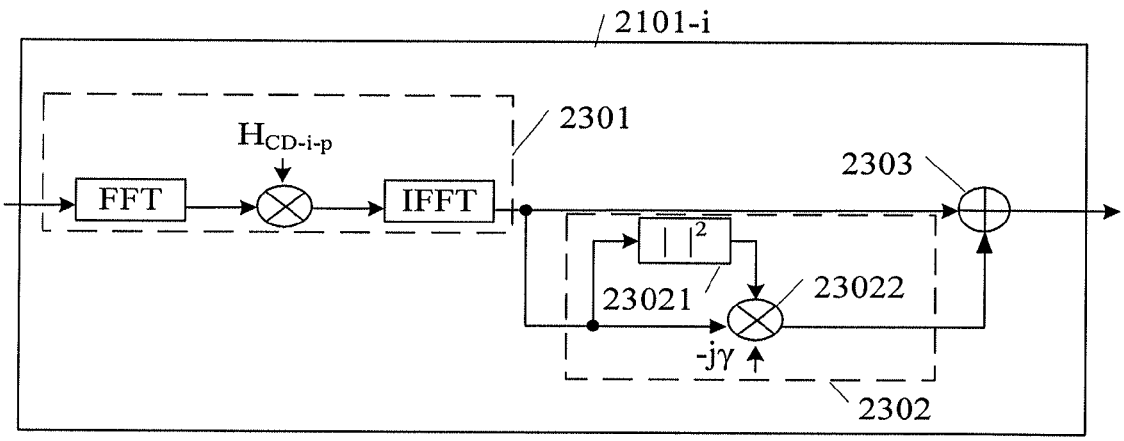
FIG. 23 is a schematic structural diagram of still another embodiment of a specific implementation of a compensation module provided in an embodiment of the present invention.

The specific implementation of the ith stage compensation module 2101-$i$ is shown in FIG. 23, a linear compensation module 2301 multiplies an input signal by a frequency domain dispersion compensation function $H_{CD-i-p}$, performs FFT transformation on the compensated signal and then outputs the signal to a nonlinear compensation module 2302, the nonlinear compensation module 2302 accomplishes a nonlinear operation through a norm processing unit 23021 and a multiplication processing unit 23022 and then outputs the signal, a summation module 2303 performs summation on output signals of the linear compensation module 2301 and the multiplication processing unit 23022 and then outputs the signal that has undergone summation. If the compensation module 2101-$i$ is not the last compensation module in the optical signal compensation device, the signal output by the summation module 2303 is transferred to a next stage compensation module, and if the compensation module 2101-$i$ is the last compensation module in the optical signal compensation device, the signal output by the summation module 2303 is the output signal of the optical signal compensation device. In the drawing, the $-j\gamma$ is a preset imaginary constant, an expression of $H_{CD-i-p}$ is: $\exp(-jD_{i-p}\lambda^2\omega^2/(4\pi c))$, $\lambda$ in the formula indicates an optical wavelength, $\omega$ indicates a frequency, c indicates the velocity of light, and $D_{i-p}$ indicates a to-be-compensated dispersion value of the ith stage compensation module. In an actual application, a D value of each stage compensation module may be determined through presetting, for example, $D_{1-p}$ of the first stage compensation module may be enabled to be equal to $D_N$ in FIG. 1, $D_{2-p}$ of the second stage compensation module may be enabled to be equal to $D_{N-1}$ in FIG. 1, and $D_{N-p}$ of the Nth stage compensation module may be enabled to be equal to $D_1$ in FIG. 1.

Figure 24:
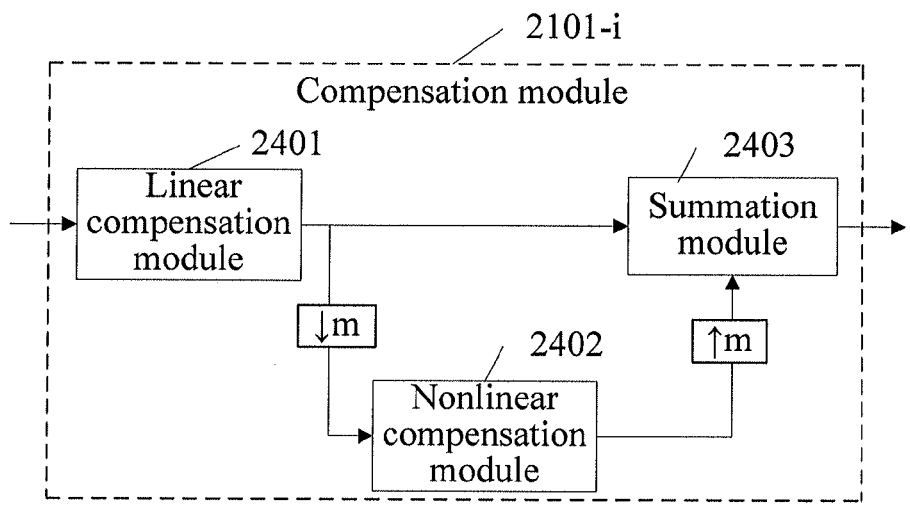
FIG. 24 is a schematic structural diagram of still another embodiment of a compensation module provided in an embodiment of the present invention.

In an application scenario of the embodiment of the present invention, different sampling rates are used to perform sampling processing on a linear compensation part and a nonlinear compensation part, so as to reduce the complexity of implementation. FIG. 24 shows a compensation module 2101-$i$ adopting different sampling rates. A nonlinear compensation module 2402, before processing an output signal of a linear compensation module 2401, perform downsampling by adopting a preset multiple value m on the signal output by the linear compensation module 2401, which reduces an original sampling rate, and uses the signal obtained through downsampling as the output signal of the linear compensation module 2401. A summation module 2403, before performing summation, restores the original sampling rate through m-multiple upsampling to perform sampling on an output signal of the nonlinear compensation module 2402 (that is, the output signal of a multiplication processing unit of the nonlinear compensation module 2402), and uses the signal obtained through sampling as the output signal of the nonlinear compensation module 2402 for performing summation.

It can be seen from the foregoing that, in the embodiments of the present invention, the structure based on the optical signal compensation device performs nonlinear compensation on the optical signal by using a new nonlinear compensation algorithm in the nonlinear compensation module, and during the process of the nonlinear compensation, it is not required to look up a table, thereby increasing the processing speed of the nonlinear compensation, and further reducing the overall processing delay of the optical signal compensation system. Further, the linear compensation and the nonlinear compensation are separated, so that a lower processing speed may be used at the nonlinear compensation part, thereby reducing the complexity while ensuring the compensation performance.

Figure 25:
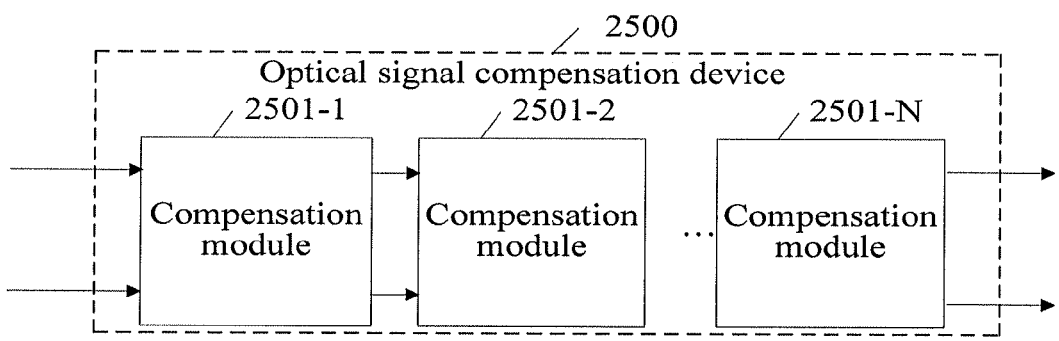
FIG. 25 is a schematic structural diagram of still another embodiment of an optical signal compensation device provided in an embodiment of the present invention.

The following describes an optical signal compensation device applicable to a polarization multiplexing system in an embodiment of the present invention is described. As shown in FIG. 25, an optical signal compensation device 2500 in the embodiment of the present invention includes:

N compensation modules 2501-1~2501-N connected in series.

As shown in FIG. 26-a, each compensation module includes a linear compensation module 2601, a nonlinear compensation module 2602, a first summation module 2603 and a second summation module 2604.

The linear compensation module 2601 is configured to perform dispersion compensation separately on two input signals.

As shown in FIG. 26-b, the nonlinear compensation module 2602 includes:

a norm processing unit 26021, configured to take a modulus of a first output signal of the linear compensation module 2601 and square the modulus to obtain a first norm value, and take a modulus of a second output signal of the linear compensation module 2601 and square the modulus to obtain a second norm value; and an operation unit 26022, configured to multiply a sum of the first norm value and the second norm value with the first output signal of the linear compensation module 2601 and a preset imaginary constant, so as to obtain a first nonlinear compensation output signal of the nonlinear compensation module 2602; and is configured to multiply the sum of the first norm value and the second norm value with the second output signal of the linear compensation module 2601 and the preset imaginary constant, so as to obtain a second nonlinear compensation output signal of the nonlinear compensation module 2602.

The first summation module 2603 is configured to perform summation on the first output signal of the linear compensation module 2601 and the first output signal of the nonlinear compensation module 2602.

The second summation module 2604 is configured to perform summation on the second output signal of the linear compensation module 2601 and the second output signal of the nonlinear compensation module 2602.

In the actual application, a different dispersion value may be preset for each compensation module to implement compensation on the dispersion caused by a different optical fiber span of the optical fiber transmission link. Definitely, a dispersion value of each compensation module may also be determined after the system performs detection on the optical fiber transmission link, which is not limited herein. The number of the compensation modules included in the optical signal compensation device in the embodiment of the present invention, that is, the value of N, may equal to a total number of optical fiber spans in the optical fiber transmission link, and definitely, N may also be another value, which is not limited herein.

Figure 27:
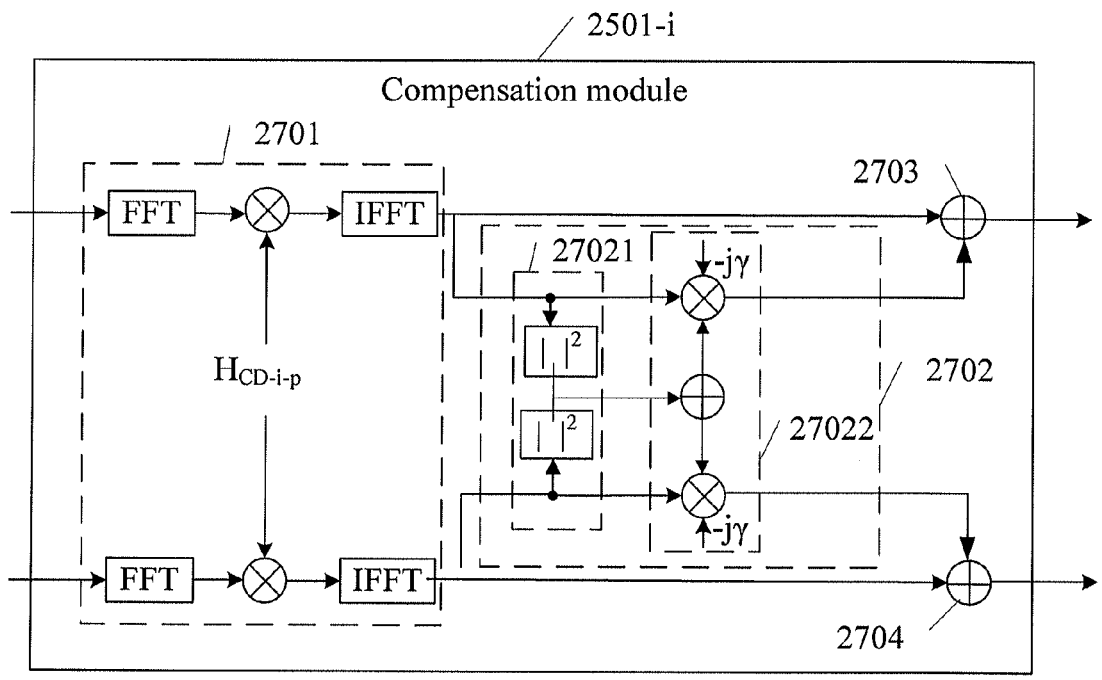
FIG. 27 is a schematic structural diagram of still another embodiment of a specific implementation of a compensation module provided in an embodiment of the present invention.

The specific implementation of the ith stage compensation module 2501-$i$ is shown in FIG. 27, a linear compensation module 2701 first converts two input signals into two frequency domain signals respectively by performing FFT transformation, multiplies the two frequency domain signals respectively by a frequency domain dispersion compensation function $H_{CD\text{-}i\text{-}p}$, converts the two compensated frequency domain signals into two time domain signals respectively through IFFT transformation, and then outputs the signals. A nonlinear compensation module 2702 accomplishes a non-linear operation through a norm processing unit 27021 and an operation unit 27022 and then outputs the signals. A first summation module 2703 and a second summation module 2704 perform summation on the two signals and then output the signals. If the compensation module 2501-$i$ is not the last compensation module in the optical signal compensation device, the signals output by the first summation module 2703 and the second summation module 2704 are transferred to a next stage compensation module, and if the compensation module 2501-$i$ is the last compensation module in the optical signal compensation device, the signals output by the first summation module 2703 and the second summation module 2704 are output signals of the optical signal compensation device. In the drawing, the $-j\gamma$ is a preset imaginary constant, an expression of $H_{CD\text{-}i\text{-}p}$ is: $\exp(-jD_{i\text{-}p}\lambda^2\omega^2/(4\pi c))$, $\lambda$ in the formula indicates an optical wavelength, $\omega$ indicates a frequency, c indicates the velocity of light, and $D_{i\text{-}p}$ indicates a to-be-compensated dispersion value of the ith stage compensation module. In an actual application, a D value of each stage compensation module may be determined through presetting, for example, $D_{1\text{-}p}$ of the first stage compensation module may be enabled to be equal to $D_N$ in FIG. 1, $D_{2\text{-}p}$ of the second stage compensation module may be enabled to be equal to $D_{N-1}$ in FIG. 1, and $D_{N\text{-}p}$ of the Nth stage compensation module may be enabled to be equal to $D_1$ in FIG. 1.

Figure 28:
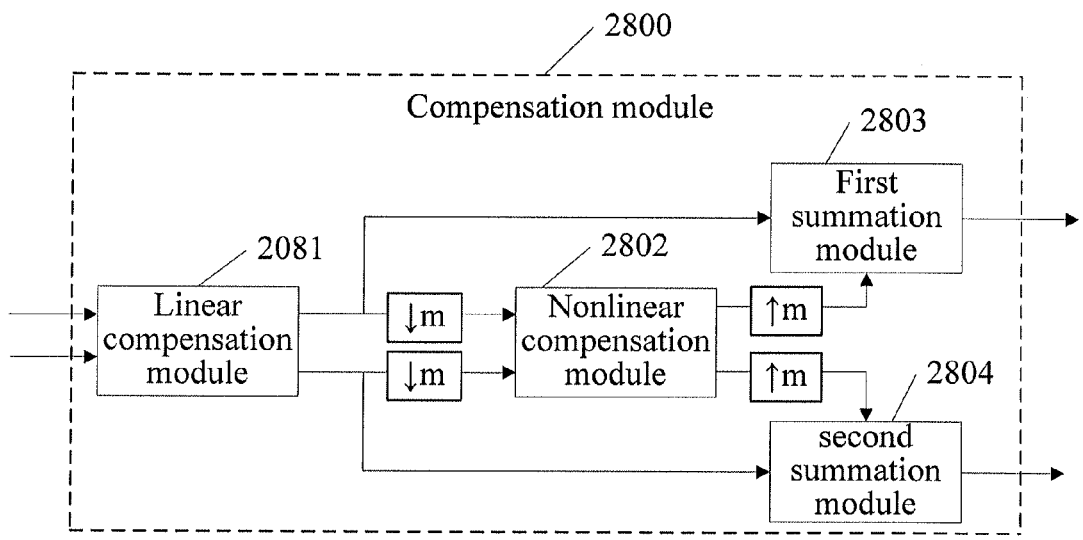
FIG. 28 is a schematic structural diagram of still another embodiment of a compensation module provided in an embodiment of the present invention.

In an application scenario of the embodiment of the present invention, different sampling rates are used to perform sampling processing on a linear compensation part and a nonlinear compensation part, so as to reduce the complexity of implementation. FIG. 28 shows a compensation module 2800 adopting different sampling rates. A nonlinear compensation module 2802, before processing two output signals of a linear compensation module 2801, perform downsampling by adopting a preset multiple value m on two output signals of the linear compensation module 2801, which reduces an original sampling rate, and uses the signals obtained through downsampling as the two output signals of the linear compensation module 2801. A first summation module 2803 and a second summation module 2804, before performing summation, restore the original sampling rate through m-multiple upsampling to perform sampling separately on two output signals of the linear compensation module 2801 (that is, the two output signals of an operation unit of the linear compensation module 2801), and uses the signals obtained through sampling as the two output signals of the linear compensation module 2801 for performing summation respectively.

It can be seen from the foregoing that, in the embodiments of the present invention, the structure based on the optical signal compensation device performs nonlinear compensation on the optical signal by using a new nonlinear compensation algorithm in the nonlinear compensation module, and during the process of the nonlinear compensation, it is no longer required to look up a table, thereby increasing the processing speed of the nonlinear compensation, and further reducing the overall processing delay of the optical signal compensation system. Further, the linear compensation and the nonlinear compensation are separated, so that a lower processing speed may be used at the nonlinear compensation part, thereby reducing the complexity while ensuring the compensation performance.

The optical signal compensation device provided in the present invention is described in detail in the foregoing description. Persons of ordinary skill in the art can make variations to the present invention in terms of the specific implementations and application scopes according to the ideas of the present invention. Therefore, the specification shall not be construed as a limit to the present invention.

What is claimed is:

1. An optical signal compensation device, comprising: a linear compensation module and N nonlinear compensation modules, wherein all of the nonlinear compensation modules and the linear compensation module are connected in parallel; wherein:

the linear compensation module is configured to perform dispersion compensation on a first input signal from a first signal path according to a first compensation dispersion value, so as to obtain a first output signal of the linear compensation module, wherein the first compensation dispersion value equals to the total amount of dispersion caused in an optical fiber transmission link;

each of the N nonlinear compensation module comprises a first dispersion compensation unit, a norm processing unit, a multiplication processing unit, and a second dispersion compensation unit;

the first dispersion compensation unit is configured to perform dispersion compensation on the first input signal according to a second compensation dispersion value, so as to obtain a first output signal of the first dispersion compensation unit;

the norm processing unit is configured to take a first modulus of the first output signal of the first dispersion compensation unit and square the first modulus, so as to obtain a first norm value; the multiplication processing unit is configured to calculate a product according to an output signal of the first dispersion compensation unit, a norm value output by the norm processing unit, and a preset imaginary constant, so as to obtain an output signal of the multiplication processing unit; the second dispersion compensation unit is configured to perform dispersion compensation on an output signal of the multiplication processing unit according to a third compensation dispersion value, so as to obtain an output signal of the nonlinear compensation module, wherein, a sum of the second compensation dispersion value and the third compensation dispersion value equals to the first compensation dispersion value; and the optical signal compensation device further comprises a first summation module, the first summation module is connected to an output end of the linear compensation module and output ends of the N nonlinear compensation modules, and configured to perform summation on the first output signal of the linear compensation module and output signals of the N nonlinear compensation modules.

2. The device according to claim 1, wherein, the multiplication processing unit is configured to calculate a product of the first output signal of the first dispersion compensation unit, the first norm value output by the norm processing unit, and a preset imaginary constant, so as to obtain a first output signal of the multiplication processing unit;

the second dispersion compensation unit is configured to perform dispersion compensation on the first output signal of the multiplication processing unit according to the third compensation dispersion value, so as to obtain a first output signal of the nonlinear compensation module;

the first summation module, is configured to perform summation on the first output signal of the linear compensation module and all first output signals of the N nonlinear compensation modules.

3. The device according to claim 2, wherein, the first dispersion compensation module is configured to, before performing dispersion compensation, perform downsampling by adopting a third multiple value on an input signal of the first dispersion compensation module;

the first summation module performing summation on the first output signal of the linear compensation module and all first output signals of the N nonlinear compensation modules is specifically:

accumulating all first output signals of the N nonlinear compensation modules;

performing upsampling by adopting the third multiple value on the signal obtained through the accumulating, so as to obtain a sampled signal; and performing summation on the sampled signal and the output signal of the linear compensation module.

4. The device according to claim 1, wherein:

the linear compensation module is configured to perform dispersion compensation on a second input signal from a second signal path according to the first compensation dispersion value, so as to obtain a second output signal of the linear compensation module;

the first dispersion compensation unit is configured to perform dispersion compensation on the second input signal according to the second compensation dispersion value, so as to obtain a second output signal of the first dispersion compensation unit;

the norm processing unit is configured to take a second modulus of the second output signal of the first dispersion compensation unit and square the second modulus, so as to obtain a second norm value;

the multiplication processing unit is configured to calculate a product of the first output signal of the first dispersion compensation unit, a preset imaginary constant and a sum of the first norm value and the second norm value, so as to obtain a first output signal of the multiplication processing unit; and is specifically configured to calculate a product of the second output signal of the first dispersion compensation unit, a preset imaginary constant and a sum of the first norm value and the second norm value, so as to obtain a second output signal of the multiplication processing unit;

the second dispersion compensation unit is configured to perform dispersion compensation on the first output signal of the multiplication processing unit according to the third compensation dispersion value, so as to obtain an first output signal of the nonlinear compensation module; and is specifically configured to perform dispersion compensation on the second output signal of the multiplication processing unit according to the third compensation dispersion value, so as to obtain an second output signal of the nonlinear compensation module; and the first summation module, is configured to perform summation on the first output signal of the linear compensation module and all first output signals of the N nonlinear compensation modules;

the optical signal compensation device further comprises a second summation module, the second summation module is connected to an output end of the linear compensation module and output ends of the N nonlinear compensation modules, and configured to perform summation on the second output signal of the linear compensation module and all second output signals of the N nonlinear compensation modules.

5. The device according to claim 4, wherein, the linear compensation module is configured to, before performing dispersion compensation, perform downsampling by adopting a second multiple value on the first input signal and the second input signal of the linear compensation module; and the first summation module is configured to, before performing summation, perform upsampling by adopting the second multiple value on the first output signal of the linear compensation module; and the second summation module is configured to, before performing summation, perform upsampling by adopting the second multiple value on the second output signal of the linear compensation module.

6. The device according to claim 4, wherein, the first dispersion compensation module is configured to, before performing dispersion compensation, perform downsampling by adopting a fourth multiple value on the first input signal and the second input signal;

the first summation module performing summation on the first output signal of the linear compensation module and all first output signals of the N nonlinear compensation modules is specifically:

accumulating all first output signals of the N nonlinear compensation modules, so as to obtain a first accumulated signal;

performing upsampling by adopting the fourth multiple value on the first accumulated signal, so as to obtain a first sampled signal; and performing summation on the first sampled signal and the first output signal of the linear compensation module;

the second summation module performing summation on the second output signal of the linear compensation module and all second output signals of the N nonlinear compensation modules is specifically:

accumulating all second output signals of the N nonlinear compensation modules, so as to obtain a second accumulated signal;

performing upsampling by adopting the fourth multiple value on the second accumulated signal, so as to obtain a second sampled signal; and performing summation on the second sampled signal and the second output signal of the linear compensation module.

7. The device according to claim 4, wherein, the optical signal compensation device comprises: a first FFT transformation module, a second FFT transformation module, a first IFFT transformation module and a second IFFT transformation module;

the first FFT transformation module is connected to an input end of the linear compensation module and input ends of the N nonlinear compensation module, and configured to perform Fast Fourier Transformation (FFT) on the first input signal of the linear compensation module and the N nonlinear compensation module; and the second FFT transformation module is connected to an input end of the linear compensation module and input ends of the N nonlinear compensation module, and configured to perform Fast Fourier Transformation (FFT) on the second input signal of the linear compensation module and the N nonlinear compensation module;

the first IFFT transformation module, connected to an output end of the first summation module, and configured to perform Inverse Fast Fourier Transformation (IFFT) on an output signal of the first summation module;

the second IFFT transformation module, connected to an output end of the second summation module, and configured to perform Inverse Fast Fourier Transformation (IFFT) on an output signal of the second summation module.

8. The device according to claim 1, wherein, the linear compensation module is configured to, before performing dispersion compensation, perform downsampling by adopting a first multiple value on an input signal of the linear compensation module; and the first summation module is configured to, before performing summation, perform upsampling by adopting the first multiple value on the output signal of the linear compensation module.

9. The device according to claim 1, wherein, the optical signal compensation device further comprises:

an FFT transformation module, connected to an input end of the linear compensation module and input ends of the N nonlinear compensation module, and configured to perform Fast Fourier Transformation (FFT) on input signals of the linear compensation module and the N nonlinear compensation module.

10. The device according to claim 1, wherein, the optical signal compensation device comprises:

an IFFT transformation module, connected to an output end of the first summation module, and configured to perform Inverse Fast Fourier Transformation (IFFT) on an output signal of the first summation module.

11. An optical signal compensation device, comprising:

N compensation modules connected in series; wherein:

a compensation module comprises a linear compensation module, a nonlinear compensation module, and a first summation module;

the linear compensation module is configured to perform dispersion compensation on an input signal from a first path, so as to obtain a first output signal of the linear compensation module;

a nonlinear compensation module comprises: a norm processing unit and a multiplication processing unit;

the norm processing unit is configured to take a first modulus of the first output signal of the linear compensation module and square the first modulus to obtain a first norm value;

the multiplication processing unit is configured to calculate a product according to an output signal of the linear compensation module, a norm value output by the norm processing unit, and a preset imaginary constant, so as to obtain an output signal of the nonlinear compensation module;

wherein, the first summation module is configured to perform summation on the first output signal of the linear compensation module and an output signal of the nonlinear compensation module.

12. The device according to claim 11, wherein:

the multiplication processing unit is configured to calculate a product of the first output signal of the linear compensation module, the first norm value output by the norm processing unit, and a preset imaginary constant, so as to obtain a first output signal of the nonlinear compensation module;

the first summation module, is configured to perform summation on the first output signal of the linear compensation module and the first output signal of the nonlinear compensation module.

13. The device according to claim 12, wherein:

the nonlinear compensation module is configured to, before performing processing on the first output signal of the linear compensation module, perform downsampling by adopting a preset multiple value on the first output signal of the linear compensation module; and the first summation module is configured to, before performing summation, perform upsampling by adopting the preset multiple value on the first output signal of the nonlinear compensation module.

14. The device according to claim 11, wherein:
the linear compensation module is configured to perform dispersion compensation on a second input signal from a second signal path, so as to obtain a second output signal of the linear compensation module;
the norm processing unit is configured to take a second modulus of the second output signal of the linear compensation module and square the second modulus, so as to obtain a second norm value;
the multiplication processing unit is configured to calculate a product of the first output signal of the linear compensation module, a preset imaginary constant and a sum of the first norm value and the second norm value, so as to obtain a first output signal of the nonlinear compensation module; and is specifically configured to calculate a product of the second output signal of the linear compensation module, a preset imaginary constant and a sum of the first norm value and the second norm value, so as to obtain a second output signal of the nonlinear compensation module;
the first summation module, is configured to perform summation on the first output signal of the linear compensation module and the first output signal of the nonlinear compensation module;
the compensation module comprises a second summation module, configured to perform summation on the second output signal of the linear compensation module and the second output signal of the nonlinear compensation module.

15. The device according to claim 14, wherein:
the nonlinear compensation module is configured to, before performing processing on the first output signal and the second output signal of the linear compensation module, perform downsampling by adopting a first multiple value on the first output signal and the second output signal of the linear compensation module;
the first summation module is configured to, before performing summation, perform upsampling by adopting the first multiple value on the first output signal of the nonlinear compensation module; and
the second summation module is configured to, before performing summation, perform upsampling by adopting the first multiple value on the second nonlinear compensation output signal of the nonlinear compensation module.

16. An optical signal compensation device, applicable to a single polarization system, comprising:
N compensation modules connected in series;
an FFT transformation module, connected to an input end of the first compensation module of the N compensation modules, wherein the FFT transformation module is configured to perform Fast Fourier Transformation (FFT) on an input signal of the first compensation module; and
an IFFT transformation module, connected to an output end of an the Nth compensation module of the N compensation modules, wherein the IFFT transformation module is configured to perform Inverse Fast Fourier Transformation (IFFT) on an output signal of the Nth compensation module;
wherein each compensation module of the N compensation modules comprises a linear compensation module, a nonlinear compensation module, and a summation module;
the linear compensation module is configured to perform dispersion compensation on an input signal;
the nonlinear compensation module comprises: an IFFT transformation sub-unit, a norm processing unit, a multiplication processing unit, and an FFT transformation sub-unit;
the IFFT transformation sub-unit is configured to perform IFFT transformation on an output signal of the linear compensation module;
the norm processing unit is configured to take a modulus of an output signal of the IFFT transformation sub-unit and square the modulus to obtain a norm value;
the multiplication processing unit is configured to calculate a product of the output signal of the IFFT transformation sub-unit, the norm value, and a preset imaginary constant; and
the FFT transformation sub-unit is configured to perform FFT transformation on an output signal of the multiplication processing unit;
wherein the summation module is configured to perform summation on output signals of the linear compensation module and the FFT transformation sub-unit.

17. The device according to claim 16, wherein,
the IFFT transformation sub-unit is configured to, before performing IFFT transformation, perform downsampling by adopting a preset multiple value on the output signal of the linear compensation module; and
the summation module is configured to, before performing summation, perform upsampling by adopting the preset multiple value on an output signal of the FFT transformation sub-unit.

* * * * *